(12) United States Patent
Fukumoto et al.

(10) Patent No.: US 12,729,347 B2

(45) Date of Patent: Sep. 8, 2026

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Naoya Fukumoto, Tokyo (JP); Yutaka Tanji, Tokyo (JP)

(73) Assignee: Resonac Corporation, Tokyo (JP)

( * ) Notice: Subject to any disclaimer, the term of this patent is extended or adjusted under 35 U.S.C. 154(b) by 120 days.

(21) Appl. No.: 18/861,277

(22) PCT Filed: Dec. 27, 2023

(86) PCT No.: PCT/JP2023/047054

§ 371 (c)(1),
(2) Date: Oct. 29, 2024

(87) PCT Pub. No.: WO2024/143499

PCT Pub. Date: Jul. 4, 2024

(65) Prior Publication Data

US 2025/0297186 A1 Sep. 25, 2025

(30) Foreign Application Priority Data

Dec. 27, 2022 (JP) ................................ 2022-210111

(51) Int. Cl.

*C10M 107/38* (2006.01)
*C08G 65/331* (2006.01)

(Continued)

(52) U.S. Cl.

CPC ....... *C10M 107/38* (2013.01); *C08G 65/3312* (2013.01); *G11B 5/7257* (2020.08);

(Continued)

(58) Field of Classification Search

CPC ........ C10M 107/38; C10M 2213/0606; C08G 65/3312; C08G 65/331; C08G 2650/48;

(Continued)

(56) References Cited

U.S. PATENT DOCUMENTS 10,262,685 B2 4/2019 Pathem
11,845,906 B2 * 12/2023 Fukumoto ............ C10M 107/38
2010/0028721 A1 * 2/2010 Hamakubo .......... C10M 107/38 428/848

FOREIGN PATENT DOCUMENTS

JP 2012-184339 A 9/2012
JP 5743438 B2 7/2015

(Continued)

*Primary Examiner* — Cephia D Toomer
(74) *Attorney, Agent, or Firm* — Sughrue Mion, PLLC

(57) ABSTRACT

This fluorine-containing ether compound is a fluorine-containing ether compound represented by Formula (1). In Formula (1), X is Formula (2-1) to (2-5), and A is Formula (3-1) or (3-2). B is a perfluoropolyether chain. D has 2 to 4 polar groups, has an oxygen atom bonded to a methylene group adjacent to D, has 1 to 15 carbon atoms, and has 0 to 9 carbon atoms in a shortest distance between carbon atoms to which adjacent polar groups in D are bonded.

[Chemical Formula 1]

(1)

(2-1)

(Continued)

-continued (2-2)

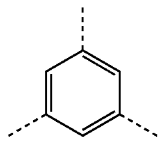

(2-3)

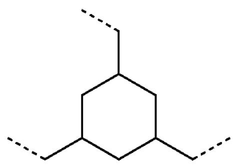

(2-4)

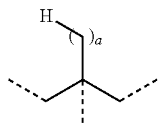

(2-5)

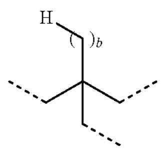

(3-1)

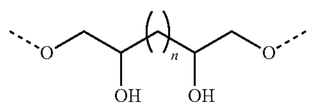

-continued (3-2)

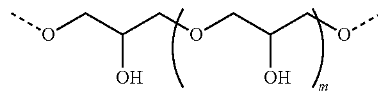

13 Claims, 1 Drawing Sheet

(51) Int. Cl.
*G11B 5/725* (2006.01)
*C10N 20/04* (2006.01)
*C10N 40/18* (2006.01)

(52) U.S. Cl.
CPC . *C10M 2213/0606* (2013.01); *C10N 2020/04* (2013.01); *C10N 2040/18* (2013.01)

(58) Field of Classification Search
CPC ...... C08G 65/007; G11B 5/7257; G11B 5/84; G11B 5/725; C10N 2020/04; C10N 2040/18; C10N 2050/02; C10N 2050/025; C10N 2030/00; C07C 43/13; C07C 43/184; C07C 43/205
See application file for complete search history.

(56) References Cited

FOREIGN PATENT DOCUMENTS

| | | | |
|---|---|---|---|
| WO | 2011/007782 | A1 | 1/2011 |
| WO | 2015/093237 | A1 | 6/2015 |
| WO | 2018/116742 | A1 | 6/2018 |
| WO | 2018/159232 | A1 | 9/2018 |
| WO | 2021/019998 | A1 | 2/2021 |
| WO | 2021/054202 | A1 | 3/2021 |
| WO | 2021/065380 | A1 | 4/2021 |
| WO | 2022/113854 | A1 | 6/2022 |
| WO | 2022/131202 | A1 | 6/2022 |
| WO | 2022/215726 | A1 | 10/2022 |

* cited by examiner

FLUORINE-CONTAINING ETHER COMPOUND, LUBRICANT FOR MAGNETIC RECORDING MEDIUM, AND MAGNETIC RECORDING MEDIUM

TECHNICAL FIELD

The present invention relates to a fluorine-containing ether compound, a lubricant for a magnetic recording medium, and a magnetic recording medium.

This is a National Stage of International Application No. PCT/JP2023/047054 filed Dec. 27, 2023, claiming priority based on Japanese Patent Application No. 2022-210111, filed Dec. 27, 2022, the content of which is incorporated herein by reference.

BACKGROUND ART

In recent years, the amount of information processing via the Internet has increased dramatically. Along with this, attention has been paid to the development of a recording medium for storing information. In particular, a magnetic recording medium, which is a type of recording medium, can store a large amount of information at a low cost and is thus expected as means for receiving increasing information.

In general, a protective layer and a lubricating layer are provided on a magnetic layer (magnetic recording layer) of the magnetic recording medium in order to ensure durability and reliability of the magnetic recording medium. The lubricating layer disposed on the outermost surface of the magnetic recording medium is required to have various characteristics such as long-term stability, chemical substance resistance (to prevent contamination such as siloxane), wear resistance, and heat resistance.

As a lubricant used in a case of forming the lubricating layer of the magnetic recording medium, for example, a lubricant containing a compound having a polar group such as a hydroxy group and an amino group at a terminal of a fluorine-based polymer having a repeating structure including $—CF_2—$ has been proposed.

For example, Patent Document 1 discloses an ether composition having a skeleton in which a perfluoropolyether chain is bonded to a perfluorinated divalent or higher saturated hydrocarbon group and having a terminal group which is an organic group having a polar group bonded to a terminal thereof through a methylene group ($—CH_2—$).

Patent Document 2 and Patent Document 3 disclose fluorine-containing ether compounds having a skeleton in which three perfluoropolyether chains are bonded to a trivalent atomic group through a linking group including a polar group and having a substituent which is an organic group having a polar group bonded to a terminal thereof through a methylene group.

Patent Document 4 discloses a fluorine-containing ether compound having a skeleton in which two perfluoropolyether chains are bonded to a divalent organic group including an alicyclic structure and at least one polar group and having a terminal group which is an organic group having a polar group bonded at a terminal thereof through a methylene group.

Patent Document 5 discloses a lubricant composition having a skeleton in which a perfluoropolyether chain is bonded to a cyclic group through a linking group including a polar group and having a $C_nF_{2n+1}$ group at a terminal thereof.

Patent Document 6 discloses a compound having a skeleton in which a perfluoropolyether chain is bonded to a benzene ring through a linking group including a methylene group and having a hydroxy group at a terminal thereof.

Patent Document 7 discloses a lubricant for a magnetic disk having a skeleton in which two perfluoropolyether chains are bonded to an aliphatic hydrocarbon chain present at a position near the center of a molecule and having a hydroxy group at a terminal thereof.

Patent Document 8 and Patent Document 9 disclose fluorine-containing ether compounds having a skeleton in which three perfluoropolyether chains are arranged in series through a linking group including a hydroxy group and having a hydroxy group at a terminal thereof.

CITATION LIST

Patent Documents

Patent Document 1: PCT International Publication No. WO 2011/007782

Patent Document 2: PCT International Publication No. WO 2018/159232

Patent Document 3: PCT International Publication No. WO 2021/065380

Patent Document 4: PCT International Publication No. WO 2022/113854

Patent Document 5: Japanese Unexamined Patent Application, First Publication No. 2012-184339

Patent Document 6: PCT International Publication No. WO 2015/093237

Patent Document 7: Japanese Patent No. 5743438

Patent Document 8: Specification of U.S. Pat. No. 10,262,685

Patent Document 9: PCT International Publication No. WO 2018/116742

SUMMARY OF INVENTION

Technical Problem

In recent years, with the diversification of the use of magnetic recording media, environmental resistance required for the magnetic recording media has become very severe. Along with this, the long-term stability of a lubricating layer, which has a great influence on the reliability and durability of magnetic recording media, is required to be further improved.

As an indicator of the long-term stability of the lubricating layer, chemical substance resistance and spin-off resistance are known. Spin-off is a phenomenon in which a lubricant is scattered or evaporated due to centrifugal force and heat generation caused by the rotation of a magnetic recording medium. In a case where spin-off occurs, the film thickness of the lubricating layer is reduced, and thus the chemical substance resistance and wear resistance of the lubricating layer deteriorate. As one method of suppressing the spin-off, it is considered to improve the adhesion of the lubricating layer to a protective layer. A polar group contained in a compound in a lubricant contributes to the improvement of the adhesion between the lubricant and the protective layer. However, in a case where the number of polar groups contained in the compound in the lubricant is too large, a chemical contaminant is attracted to the lubricating layer formed by using the lubricant, and the chemical substance resistance of the lubricating layer deteriorates.

The present invention has been made in view of the above circumstances, and an object of the present invention is to provide a fluorine-containing ether compound which has excellent chemical substance resistance, can form a lubricating layer capable of suppressing spin-off, and can be suitably used as a material for a lubricant for a magnetic recording medium.

Another object of the present invention is to provide a lubricant for a magnetic recording medium which contains the fluorine-containing ether compound of the present invention, has good chemical substance resistance, and is capable of forming a lubricating layer having a high spin-off suppression effect.

Still another object of the present invention is to provide a magnetic recording medium which has a lubricating layer containing the fluorine-containing ether compound of the present invention and has good chemical substance resistance and a high spin-off suppression effect.

Solution to Problem

The present invention includes the following aspects.

[1] A fluorine-containing ether compound represented by General Formula (1),

[Chemical Formula 1]

(1)

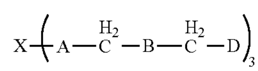

(In General Formula (1), X is a trivalent atomic group represented by any of Formulae (2-1) to (2-5) below. A is a linking group represented by Formula (3-1) or Formula (3-2) below. Three A's may be the same in part or in whole, or may be different from each other. B is a perfluoropolyether chain. Three B's may be the same in part or in whole, or may be different from each other. D is a terminal group which has 2 to 4 polar groups, has an ether oxygen atom bonded to a methylene group adjacent to D, has 1 to 15 carbon atoms, and has 0 to 9 carbon atoms in a shortest distance between carbon atoms to which adjacent polar groups in D are bonded. Three D's may be the same as each other in part or in whole, or may be different from each other.)

[Chemical Formula 2]

(2-1)

(2-2)

(2-3)

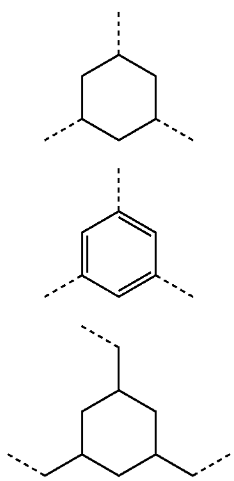

-continued (2-4)

(2-5)

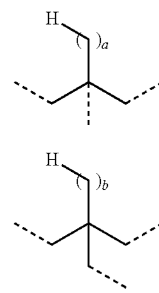

(In Formula (2-4), a represents an integer of 0 to 5.)
(In Formula (2-5), b represents an integer of 0 to 5.)

[Chemical Formula 3]

(3-1)

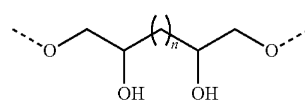

(3-2)

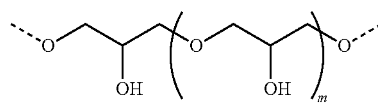

(In Formula (3-1), n represents an integer of 0 to 6.)
(In Formula (3-2), m represents an integer of 1 to 2.)

[2] The fluorine-containing ether compound according to [1], in which in Formula (2-4), a is 0, and in Formula (2-5), b is an integer of 0 to 2.

[3] The fluorine-containing ether compound according to [1] or [2], in which the polar group is at least one polar group selected from the group consisting of a hydroxy group, an amino group, and a carboxy group.

[4] The fluorine-containing ether compound according to any one of [1] to [3], in which the polar group contains at least one hydroxy group.

[5] The fluorine-containing ether compound according to any one of [1] to [4], in which D's in General Formula (1) are each independently a terminal group represented by any of Formulae (4-1) to (4-3).

[Chemical Formula 4]

(4-1)

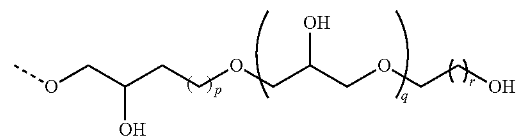

(4-2)

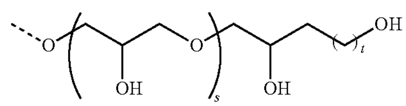

(4-3)

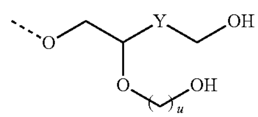

(In Formula (4-1), p represents an integer of 0 to 3, q represents an integer of 0 to 2, and r represents an integer of 1 to 5. A total value of p and r is 1 to 5.)

(In Formula (4-2), s represents an integer of 0 to 2, and t represents an integer of 0 to 5.)

(In Formula (4-3), u represents an integer of 2 to 4. Y represents a linear alkylene group which may have an ether oxygen atom, or a single bond. In a case where Y is the alkylene group, a total number of carbon atoms and oxygen atoms contained in Y is 1 to 5.)

[6] The fluorine-containing ether compound according to any one of [1] to [5], in which all the three D's in General Formula (1) are the same as one another.

[7] The fluorine-containing ether compound according to any one of [1] to [6], in which at least one of the three A's in General Formula (1) is Formula (3-1).

[8] The fluorine-containing ether compound according to any one of [1] to [7], in which the three B's in General Formula (1) are each independently a perfluoropolyether chain represented by Formula (5).

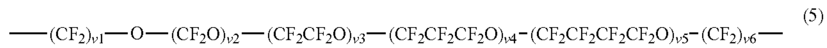

(5)

(In Formula (5), v2, v3, v4, and v5 represent average degrees of polymerization, and each independently represent 0 to 20. Here, all of v2, v3, v4, and v5 are not 0 at the same time. v1 and v6 are average values representing the number of $CF_2$'s, and each independently represent 1 to 3. An order of arrangement of ($CF_2O$), ($CF_2CF_2O$), ($CF_2CF_2CF_2O$), and ($CF_2CF_2CF_2CF_2O$), which are repeating units in Formula (5), is not particularly limited.)

[9] The fluorine-containing ether compound according to any one of [1] to [8], in which the three B's in General Formula (1) are each independently any one selected from perfluoropolyether chains represented by Formulae (5-1) to (5-4).

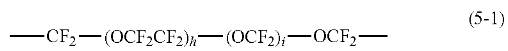

(5-1)

(In Formula (5-1), h and i represent average degrees of polymerization, h represents 1 to 20, and i represents 0 to 20.)

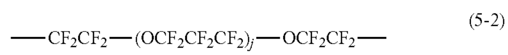

(5-2)

(In Formula (5-2), j represents an average degree of polymerization, and represents 1 to 15.)

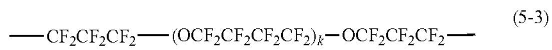

(5-3)

(In Formula (5-3), k represents an average degree of polymerization, and represents 1 to 10.)

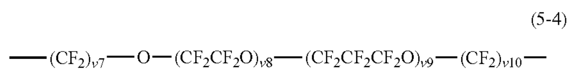

(5-4)

(In Formula (5-4), v8 and v9 represent average degrees of polymerization, and each independently represent 1 to 20. v7 and v10 are average values representing the number of $CF_2$'s, and each independently represent 1 to 2.)

[10] The fluorine-containing ether compound according to any one of [1] to [9], in which a number-average molecular weight is within a range of 500 to 10000.

[11] A lubricant for a magnetic recording medium, including the fluorine-containing ether compound according to any one of [1] to [10].

[12] A magnetic recording medium including at least in order, on a substrate, a magnetic layer, a protective layer, and a lubricating layer, in which the lubricating layer includes the fluorine-containing ether compound according to any one of [1] to [10].

[13] The magnetic recording medium according to [12], in which an average film thickness of the lubricating layer is 0.5 nm to 2.0 nm.

Advantageous Effects of Invention

The fluorine-containing ether compound of the present invention is a compound represented by General Formula (1) and is suitable as a material for a lubricant for a magnetic recording medium.

The lubricant for a magnetic recording medium of the present invention contains the fluorine-containing ether compound of the present invention, and thus has good chemical substance resistance and can form a lubricating layer having a high spin-off suppression effect.

The magnetic recording medium of the present invention has a lubricating layer containing the fluorine-containing ether compound of the present invention. Therefore, the magnetic recording medium of the present invention has good chemical substance resistance, a high spin-off suppression effect, and excellent reliability and durability. In addition, the magnetic recording medium of the present invention has a lubricating layer that has good chemical substance resistance and can suppress spin-off, and thus can further reduce the floating height of a magnetic head.

DESCRIPTION OF EMBODIMENTS

Figure 1:
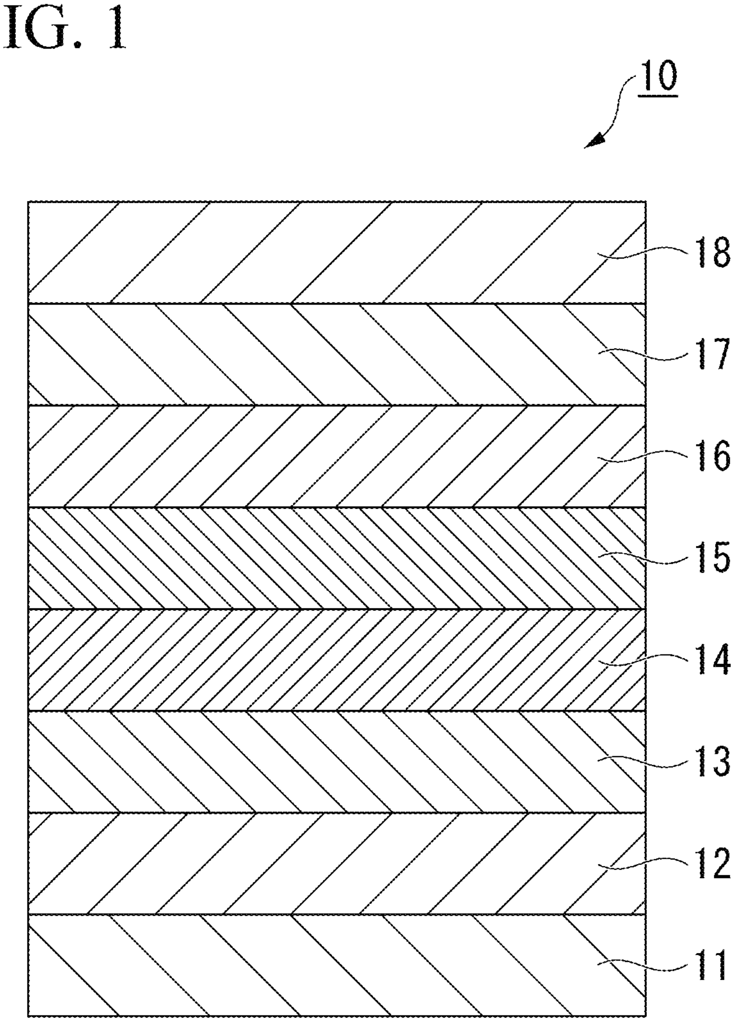
FIG. 1 is a schematic cross-sectional view showing one embodiment of a magnetic recording medium of the present invention.

In order to achieve the above objects, the present inventors have conducted intensive studies as described below.

In the related art, as a material of a lubricant for a magnetic recording medium (hereinafter, may be abbreviated as "lubricant") to be applied to a surface of a protective layer, a fluorine-containing ether compound having a chain-like structure including a plurality of perfluoropolyether chains, in which an adsorption site having a polar group is disposed between a terminal of the chain-like structure and the perfluoropolyether chains, is preferably used. The adsorption site in the fluorine-containing ether compound is bonded to an active site on the protective layer to improve the adhesion of a lubricating layer to the protective layer.

However, in a case where a thin lubricating layer is formed on the protective layer using a lubricant in the related art, as described below, it is difficult to realize a lubricating layer having good chemical substance resistance in which spin-off is less likely to occur.

That is, in a case where a fluorine-containing ether compound having a plurality of hydroxy groups in a molecule of the lubricant is used in order to increase the adhesion of the lubricating layer to the protective layer, spin-off may be suppressed. However, the proportion of the polar group that does not interact with the active point on the protective layer in the fluorine-containing ether compound increases, which causes an environmental substance that generates a contaminant to be attracted to the lubricating layer and the chemical substance resistance of the lubricating layer to be degraded.

Therefore, the present inventors focused on the adsorption site of the fluorine-containing ether compound contained in the lubricating layer, which can interact with the active site on the protective layer, and conducted intensive studies to realize a fluorine-containing ether compound in which an adsorption site that does not participate in the interaction with the active site on the protective layer is less likely to be generated in the lubricating layer, as described below.

The present inventors first examined a fluorine-containing ether compound in which three perfluoropolyether chains B are bonded to a trivalent atomic group X disposed at the center through linking groups A having a plurality of hydroxy groups, and terminal groups D having a polar group are disposed at terminals of three perfluoropolyether chains B. In this fluorine-containing ether compound, the trivalent atomic group X is caused to closely adhere to the protective layer by three linking groups A which are adsorption sites disposed in the vicinity of the trivalent atomic group X. In addition, the perfluoropolyether chain B extending in three directions from the trivalent atomic group X is caused to closely adhere to the protective layer by the linking group A and the terminal group D which are disposed at each of both ends of each perfluoropolyether chain B.

In such a fluorine-containing ether compound, the strength of the interaction of each adsorption site with the active site on the protective layer was examined so that an adsorption site that does not participate in the interaction with the active site on the protective layer is not generated.

As a result, it was found that, in a fluorine-containing ether compound, it is necessary that the balance between the strength of the interaction between the terminal group D and the active site on the protective layer and the strength of the interaction between the linking group A and the active site on the protective layer is appropriate, and the terminal group D and the linking group A can interact with the active site on the protective layer with sufficient strength.

That is, in a case where the interaction of the linking group A between the interaction between the terminal group D and the active site on the protective layer and the interaction between the linking group A and the active site on the protective layer is strongly dominant, an adsorptive group (polar group) that does not participate in the interaction between the terminal group D and the active site on the protective layer is generated. As a result, an adsorptive group that does not participate in the interaction attracts a chemical contaminant to the lubricating layer, and the chemical substance resistance deteriorates. In addition, in a case where the interaction is too weak in one or both of the interaction between the terminal group D and the active site on the protective layer and the interaction between the linking group A and the active site on the protective layer, spin-off occurs, and the film thickness of the lubricating layer is reduced.

Therefore, the present inventors repeatedly studied the structures of the trivalent atomic group X, the terminal group D, and the linking group A in the fluorine-containing ether compound.

As a result, it was found that the fluorine-containing ether compound is preferably caused to have a skeleton in which three perfluoropolyether chains B are bonded to a trivalent atomic group X represented by Formulae (2-1) to (2-5) through divalent linking groups A represented by Formula (3-1) or (3-2) and having a specific terminal group D bonded to a terminal of each perfluoropolyether chain B through a methylene group. The terminal group D is a terminal group which has 2 to 4 polar groups, has an ether oxygen atom bonded to a methylene group adjacent to D, has 1 to 15 carbon atoms, and has 0 to 9 carbon atoms in a shortest distance between carbon atoms to which adjacent polar groups in D are bonded.

In the lubricating layer containing such a fluorine-containing ether compound, the terminal group D and the linking group A in the fluorine-containing ether compound can interact with the active site on the protective layer with sufficient strength, and the balance between the strength of the interaction between the terminal group D and the active site on the protective layer and the strength of the interaction between the linking group A and the active site on the protective layer is appropriate. Therefore, an adsorption site that does not participate in the interaction with the active site on the protective layer is less likely to be generated. As a result, a lubricating layer having excellent adhesion to the protective layer, in which spin-off is less likely to be caused, can be formed. In addition, since the fluorine-containing ether compound has a small number of polar groups that do not participate in the interaction with the active points on the protective layer, it is possible to suppress the attraction of a chemical contaminant to the lubricating layer, and to form a lubricating layer having excellent chemical substance resistance. Furthermore, this fluorine-containing ether compound has three perfluoropolyether chains B, and the number of carbon atoms in the terminal group D is not too large. Therefore, the lubricating layer including the above-described component has a low surface free energy, is less likely to locally generate a spot having a high surface free energy, and is less likely to be contaminated with a chemical contaminant.

Furthermore, the present inventors confirmed that a lubricating layer having good chemical substance resistance and a high spin-off suppression effect can be formed by using a lubricant containing the fluorine-containing ether compound, and conceived the present invention.

Hereinafter, a fluorine-containing ether compound, a lubricant for a magnetic recording medium, and a magnetic recording medium of the present invention will be described in detail. The present invention is not limited only to embodiments shown below.

[Fluorine-Containing Ether Compound]

The fluorine-containing ether compound of the present embodiment is represented by General Formula (1).

[Chemical Formula 5]

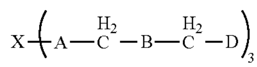

(1)

(In General Formula (1), X is a trivalent atomic group represented by any of Formulae (2-1) to (2-5) below. A is a linking group represented by Formula (3-1) or Formula (3-2). Three A's may be the same in part or in whole, or may be different from each other. B is a perfluoropolyether chain. Three B's may be the same in part or in whole, or may be different from each other. D is a terminal group which has 2 to 4 polar groups, has an ether oxygen atom bonded to a methylene group adjacent to D, has 1 to 15 carbon atoms, and has 0 to 9 carbon atoms in a shortest distance between carbon atoms to which adjacent polar groups in D are bonded. Three D's may be the same as each other in part or in whole, or may be different from each other.)

[Chemical Formula 6]

(2-1)

(2-2)

(2-3)

(2-4)

(2-5)

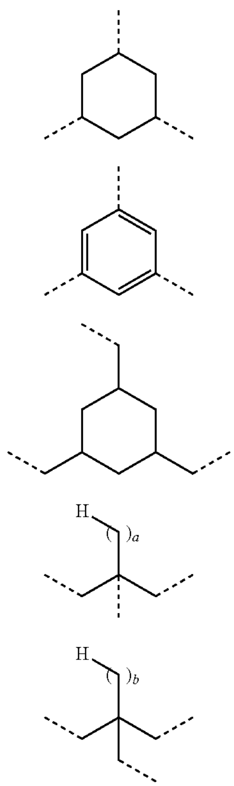

(In Formula (2-4), a represents an integer of 0 to 5.)
(In Formula (2-5), b represents an integer of 0 to 5.)

[Chemical Formula 7]

(3-1)

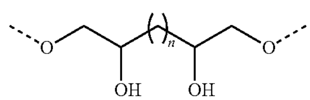

-continued (3-2)

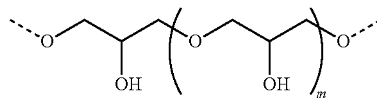

(In Formula (3-1), n represents an integer of 0 to 6.)
(In Formula (3-2), m represents an integer of 1 to 2.)

(Trivalent Atomic Group Represented by X)

X is a trivalent atomic group represented by any of Formulae (2-1) to (2-5). Therefore, three perfluoropolyether chains B bonded to the trivalent atomic group X through the divalent linking groups A are each disposed to spread in three directions from the trivalent atomic group X. As a result, a lubricating layer having excellent adhesion to the protective layer can be formed.

In a case where the trivalent atomic group X is represented by any of Formulae (2-1) to (2-3), three linking sites to the divalent linking groups A in Formulae (2-1) to (2-3) are separated from each other by the same number of carbon atoms. In addition, in a case where the trivalent atomic group X is represented by Formula (2-4), a tertiary or quaternary carbon atom disposed at the center of Formula (2-4) and two carbon atoms adjacent thereto are three linking sites with the divalent linking groups A. In addition, in a case where the trivalent atomic group X is represented by Formula (2-5), three carbon atoms adjacent to the tertiary or quaternary carbon atom disposed at the center of Formula (2-5) are three linking sites with the divalent linking groups A. Therefore, it is considered that three perfluoropolyether chains B bonded to the trivalent atomic group represented by any one of Formulae (2-1) to (2-5) through the divalent linking groups A can spread in three directions at substantially equal intervals with respect to the trivalent atomic group X and exhibit better coatability with respect to the protective layer.

All of the trivalent atomic groups X represented by Formulae (2-1) to (2-5) have a sterically appropriate bulkiness. Specifically, the trivalent atomic groups represented by Formulae (2-1) to (2-3) have a bulky ring-like structure at the center. The trivalent atomic groups represented by Formulae (2-4) and (2-5) have a tertiary or quaternary carbon atom in the center and are thus bulky. From this, the trivalent atomic group X appropriately suppresses the interaction between the hydroxy group contained in the linking group A and the active site on the protective layer.

Here, for example, in a case where a divalent or trivalent atomic group having a small steric hindrance with respect to the linking group A is disposed instead of the trivalent atomic group X represented by Formulae (2-1) to (2-5), the interaction between the linking group A and the active site on the protective layer becomes excessively strong. Therefore, the balance between the strength of the interaction between the linking group A and the active site on the protective layer and the strength of the interaction between the terminal group D and the active site on the protective layer is broken, and the chemical substance resistance of the lubricating layer containing the fluorine-containing ether compound deteriorates.

In addition, for example, in a case where a divalent atomic group having a large steric hindrance with respect to the linking group A is disposed instead of the trivalent atomic group X represented by Formulae (2-1) to (2-5), the interaction between the hydroxy group of the linking group A and the active site on the protective layer can be suppressed by the divalent atomic group, but the number of perfluoropolyether chains B bonded to the divalent atomic group is only two. Therefore, the coatability with respect to the protective layer is insufficient and the chemical substance resistance is not sufficiently obtained, as compared with the lubricating layer containing the fluorine-containing ether compound represented by Formula (1) in which three perfluoropolyether chains B are disposed to extend in three directions.

In Formula (2-4), a represents an integer of 0 to 5. Since a is 5 or less, a substituent represented by $—(CH_2)_a—H$ is not too bulky, and the trivalent atomic group represented by Formula (2-4) has a structure having an appropriate steric bulkiness. From the viewpoint of ease of availability of raw materials, a is preferably an integer of 0 to 1, and a is more preferably 0.

In Formula (2-5), b represents an integer of 0 to 5. Since b is 5 or less, a substituent represented by $—(CH_2)_b—H$ is not too bulky, and the trivalent atomic group represented by Formula (2-5) has a structure having an appropriate steric bulkiness. From the viewpoint of ease of availability of raw materials, b is preferably an integer of 0 to 3 and more preferably an integer of 0 to 2.

(Linking Group Represented by a)

A is a divalent linking group represented by Formula (3-1) or (3-2). The linking group A can interact with the active point on the protective layer with sufficient strength due to a synergistic effect of the functions of [A-1] to [A-3] described below. Moreover, the strength of the interaction between the linking group A and the active site on the protective layer is appropriately balanced with the strength of the interaction between the terminal group D and the active site on the protective layer due to a synergistic effect of the functions of [A-4] and [A-5] described below. That is, it is possible to suppress the interaction between the linking group A and the active site on the protective layer becoming excessively strong as compared with the interaction between the terminal group D and the active site on the protective layer. As a result, it is possible to suppress the generation of a polar group that does not participate in the interaction with the active site on the protective layer due to the lack of the active site on the protective layer that can interact with the terminal group D. Therefore, it is possible to prevent the polar group that does not participate in the interaction with the active point on the protective layer from attracting a chemical contaminant to the lubricating layer and degrading the chemical substance resistance of the lubricating layer.

[A-1] The linking group A has two or three hydroxy groups. Specifically, the divalent linking group represented by Formula (3-1) has two hydroxy groups. The divalent linking group represented by Formula (3-2) has two or three hydroxy groups. Since the linking group A has two or more hydroxy groups, even in a case where a part of the hydroxy groups contained in the linking group A is inhibited from being adsorbed to the protective layer due to the bulkiness of the adjacent trivalent atomic group X and the perfluoropolyether chain B, the other hydroxy groups can be adsorbed to the protective layer. Therefore, the lubricating layer containing the fluorine-containing ether compound has good adhesion, and spin-off is suppressed.

Here, for example, in a case where a divalent linking group having only one hydroxy group is disposed instead of the linking group A, the adsorption of the hydroxy group contained in the divalent linking group to the protective layer may be inhibited by the trivalent atomic group X and the perfluoropolyether chain B, and the divalent linking group may not be capable of participating in the interaction with the active site on the protective layer.

[A-2] The linking group A has an ether oxygen atom bonded to a methylene group bonded to the perfluoropolyether chain B. Therefore, the linking group A has appropriate flexibility and can move independently and freely without being linked to the perfluoropolyether chain B. From this, the separation of the linking group A from the protective layer due to the linking group A moving in conjunction with the molecular motion of the perfluoropolyether chain B is less likely to occur, and the hydroxy group contained in the linking group A is likely to participate in the interaction with the active site on the protective layer.

[A-3] The linking group A has a chain-like structure having 6 or more atoms. Specifically, the number of atoms forming the chain-like structure in the divalent linking group represented by Formula (3-1) is 6 to 12. In a case where m in Formula (3-2) is 1, the number of atoms forming the chain-like structure of the divalent linking group represented by Formula (3-2) is 9, and in a case where m is 2, the number of atoms forming the chain-like structure of the divalent linking group represented by Formula (3-2) is 13. Therefore, in the fluorine-containing ether compound represented by General Formula (1), the distance between the adjacent trivalent atomic group X and the perfluoropolyether chain B is sufficiently secured by the linking group A. Moreover, since ether oxygen atoms are disposed at both terminals of the chain-like structure, the linking group A has appropriate flexibility. From these, the influence of the bulkiness of the trivalent atomic group X and the perfluoropolyether chain B on the adsorption force of the hydroxy group contained in the linking group A to the protective layer is not too large. Therefore, the hydroxy group of the linking group A can interact with the active point on the protective layer with sufficient strength. That is, the adsorption force of the hydroxy group of the linking group A to the protective layer can maintain an appropriate strength.

[A-4] The linking group A is disposed between the trivalent atomic group X and the perfluoropolyether chain B. Therefore, the interaction of the hydroxy group of the linking group A with the active site on the protective layer is buffered by the trivalent atomic group X and the perfluoropolyether chain B, which are each disposed on both sides of the linking group A, and the interaction of the hydroxy group with the active site on the protective layer is appropriately suppressed.

[A-5] Since the linking group A has 3 or less hydroxy groups, it is possible to suppress the interaction between the linking group A and the active site on the protective layer becoming too strong. The number of the hydroxy groups contained in the linking group A is preferably 2 since the balance between the strengths of the interaction of the linking group A and the terminal group D with the active sites on the protective layer becomes more appropriate.

In the divalent linking group represented by Formula (3-1), since 0 to 6 carbon atoms are present between carbon atoms to which two hydroxy groups in Formula (3-1) are each bonded, the distance between two hydroxy groups is appropriate. Since the number of carbon atoms between two carbon atoms to which the hydroxy group is bonded is 6 or less, the distance between the hydroxy groups is not too far, and a synergistic effect of two hydroxy groups supporting the interaction with the protective layer each other is obtained. Therefore, it is possible to form a lubricating layer having sufficient adhesion to the protective layer, in which spin-off is suppressed. Since the synergistic effect of two hydroxy groups in Formula (3-1) supporting the interaction between the hydroxy group and the protective layer each other becomes significant, n in Formula (3-1) is preferably 0 to 4, and more preferably 0 to 2.

The divalent linking group represented by Formula (3-2) includes a structure in which two or three glycerin structures ($-O-CH_2-CH(OH)-CH_2-$) are linked. Since the glycerin structure is flexible, the structure represented by Formula (3-2) in which two or three glycerin structures are linked is extremely flexible, and the hydroxy group can move flexibly. Therefore, even in a case where the perfluoropolyether chain B disposed on the terminal side of the linking group A performs a molecular motion, two or three hydroxy groups in the divalent linking group represented by Formula (3-2) can each independently move freely, and the interaction between the hydroxy group in the divalent linking group and the protective layer is likely to be maintained.

In Formula (3-2), m represents an integer of 1 to 2. In a case where m is 1, the number of the hydroxy groups in the divalent linking group represented by Formula (3-2) is 2. Therefore, in a case where all three linking groups A in General Formula (1) are represented by Formula (3-2) and m is 1, the total number of the hydroxy groups disposed in the linking group A of the fluorine-containing ether compound represented by General Formula (1) is 6. In a case where m is 2, the number of the hydroxy groups in the divalent linking group represented by Formula (3-2) is 3. Therefore, in a case where all three linking groups A in General Formula (1) are represented by Formula (3-2) and m is 2, the total number of hydroxy groups disposed in the linking group A of the fluorine-containing ether compound represented by General Formula (1) is 9. Therefore, in a case where m is 1 to 2, the number of interaction points with the protective layer is appropriate, a lubricating layer having sufficient adhesion can be formed, and deterioration of spin-off can be suppressed.

Three linking groups A in General Formula (1) may be the same as each other in part or in whole, or may be different from each other. Therefore, the number of the hydroxy groups contained in three linking groups A may be the same as or different from each other. It is preferable that the numbers of the hydroxy groups contained in three linking groups A are the same as one another since the coating state of the fluorine-containing ether compound on the protective layer is more uniform, and a lubricating layer having better adhesion can be formed. Furthermore, in a case where all the structures of three linking groups A are the same as one another, the synthesis of the fluorine-containing ether compound is easy, which is more preferable.

At least one of three linking groups A in General Formula (1) is preferably Formula (3-1). Since the linking group A represented by Formula (3-1) does not have an ether oxygen atom between adjacent hydroxy groups, the linking group A has excellent rigidity as compared with the linking group represented by Formula (3-2) having an ether oxygen atom between adjacent hydroxy groups. Therefore, in a case where the perfluoropolyether chain B is disposed through the linking group A represented by Formula (3-1), each perfluoropolyether chain B is likely to be disposed to extend in three directions on the protective layer with respect to the trivalent atomic group X. As a result, even in a case where the thickness of the lubricating layer is small, excellent adhesion and excellent coatability with respect to the protective layer can be obtained.

(Terminal Group Represented by D)

In the fluorine-containing ether compound represented by General Formula (1), D is a terminal group which has 2 to 4 polar groups, has an ether oxygen atom bonded to a methylene group adjacent to D, has 1 to 15 carbon atoms, and has 0 to 9 carbon atoms in a shortest distance between carbon atoms to which adjacent polar groups in D are bonded. The terminal group D can interact with the active point on the protective layer with sufficient strength due to a synergistic effect of the functions of [D-1] to [D-3] described below. Moreover, the strength of the interaction between the terminal group D and the active site on the protective layer is appropriately balanced with the strength of the interaction between the linking group A and the active site on the protective layer due to the function of [D-4] described below.

[D-1] Since the number of the polar groups in the terminal group D is 2 or more, in a case where a lubricating layer is formed on the protective layer using a lubricant containing a fluorine-containing ether compound, a suitable interaction occurs between the lubricating layer and the protective layer. As a result, the lubricating layer has excellent adhesion to the protective layer and has a high spin-off suppression effect.

[D-2] The terminal group D has an ether oxygen atom at an end portion on a side bonded to the methylene group adjacent to the terminal group D. The ether oxygen atom disposed at the end part of the terminal group D forms an ether bond ($-O-$) with the adjacent methylene group. This ether bond imparts appropriate flexibility to the fluorine-containing ether compound represented by General Formula (1) and increases the affinity between the polar groups contained in the terminal group D and the protective layer. From this, the fluorine-containing ether compound represented by General Formula (1) is less likely to generate a polar group that does not participate in the interaction with the active points on the protective layer, and thus a lubricating layer that can uniformly coat the entire surface of the protective layer and has excellent adhesion to the protective layer can be formed.

[D-3] In the terminal group D, the number of carbon atoms in the shortest distance between carbon atoms, to which adjacent polar groups in the terminal group D are bonded, is 9 or less, and the distance between the adjacent polar groups is not too long. Therefore, the terminal group D has sufficient flexibility, and in a case where each polar group included in the terminal group D interacts with the active point on the protective layer, a synergistic effect of supporting the interaction with the active point on the protective layer of the other adjacent polar group is obtained. As a result, the polar groups included in the terminal group D are less likely to be separated from the protective layer and are less likely to be a polar group that does not participate in the interaction with the active point on the protective layer. Therefore, the fluorine-containing ether compound represented by General Formula (1) has excellent adhesion to the protective layer, and can form a lubricating layer having a high spin-off suppression effect. The number of carbon atoms in the shortest distance between carbon atoms to which adjacent polar groups are bonded is preferably 0 to 6 and more preferably 0 to 4.

[D-4] Since the number of the polar groups in the terminal group D is 4 or less, in the lubricating layer containing the fluorine-containing ether compound, balance between the strengths of the interaction of the linking group A and the terminal group D with the active sites on the protective layer becomes appropriate, and a polar group that does not interact with the active site on the protective layer is less likely to be generated. Therefore, the attraction of a chemical contaminant to the lubricating layer is suppressed, and the deterioration of the chemical substance resistance of the lubricating layer can be suppressed. The number of the polar groups included in the terminal group D is preferably 2 or 3 and most preferably 2, since a polar group that does not interact with an active point on the protective layer is less likely to be generated and the balance between spin-off resistance and chemical substance resistance is good in the fluorine-containing ether compound. In a case where the number of the polar groups included in each of three terminal groups D is two, in a magnetic recording medium having the lubricating layer including the fluorine-containing ether compound, the balance between the interaction between the linking group A and the active site on the protective layer and the interaction between the terminal group D and the active site on the protective layer is better.

Furthermore, the number of the carbon atoms included in the terminal group D is 15 or less. In a case where a portion having a larger number of carbon atoms than the number of fluorine atoms is present in the lubricating layer containing the fluorine-containing ether compound, a spot having a high surface free energy is locally generated, and the spot may be contaminated by a chemical contaminant. On the other hand, in the lubricating layer including the fluorine-containing ether compound represented by General Formula (1), the number of the carbon atoms included in the terminal group D is 15 or less, so that the surface free energy is low and contamination by a chemical contaminant is less likely to occur. The number of the carbon atoms included in the terminal group D is preferably 10 or less.

Three terminal groups D in General Formula (1) may be the same in part or in whole, or may be different from each other. Therefore, the number of the polar groups contained in three terminal groups D may be the same as or different from each other. It is preferable that the numbers of the polar groups contained in three terminal groups D are the same as one another since the coating state of the fluorine-containing ether compound on the protective layer is more uniform, and a lubricating layer having more favorable adhesion can be formed. Furthermore, in a case where all of the structures of three terminal groups D are the same as one another, the fluorine-containing ether compound is easily synthesized, which is more preferable.

The total number of the polar groups contained in three terminal groups D in General Formula (1) is 6 to 12, preferably 6 to 9, more preferably 6 or 7, and most preferably 6. Since the total number of the above-described polar groups is 6 or more, the interaction between the polar group contained in the terminal group D of the fluorine-containing ether compound and the protective layer is strong. As a result, the terminal groups D of the fluorine-containing ether compound are separated from the protective layer, and spin-off in which the film thickness of the lubricating layer is reduced is suppressed. Therefore, the fluorine-containing ether compound enables a lubricating layer having a high spin-off suppression effect to be obtained. In a case where the total number of the above-described polar groups is 9 or less, a polar group that does not participate in the bonding between the lubricating layer and the active point on the protective layer is less likely to be generated. Therefore, the attraction of a chemical contaminant to the lubricating layer by the polar group that does not participate in the bonding between the lubricating layer and the active site on the protective layer is further suppressed. Therefore, a lubricating layer having more excellent chemical substance resistance can be formed, which is preferable.

The polar group contained in the terminal group D is preferably a polar group selected from the group consisting of a hydroxy group (—OH), an amino group (—$NH_2$), a carboxy group (—COOH), a carbonyl group (—CO—), and a sulfo group (—$SO_3H$). Two to four polar groups included in each of the terminal groups D may be the same in part or in whole, or may be different from each other. Among the above, the polar group contained in the terminal group D is preferably at least one polar group selected from the group consisting of a hydroxy group, an amino group, and a carboxy group. In a case where the protective layer to which the lubricant is applied is formed of carbon including nitrogen, the hydroxy group, the amino group, and the carboxy group can form a hydrogen bond with a nitrogen atom to increase the affinity to the protective layer.

The terminal group D more preferably includes at least one hydroxy group as a polar group. In a case where at least one of two to four polar groups included in the terminal group D is a hydroxy group, the adhesion between the protective layer and the lubricating layer containing the fluorine-containing ether compound is further improved in a case where the protective layer to which the lubricant is applied is formed of carbon containing nitrogen. Since the polar groups contained in the terminal group D can further form a lubricating layer with good adhesion to the protective layer, it is still more preferable that all of the polar groups are hydroxy groups.

In the fluorine-containing ether compound represented by General Formula (1), it is preferable that the terminal groups D are each independently a terminal group represented by any of Formulae (4-1) to (4-3).

[Chemical Formula 8]

(4-1)

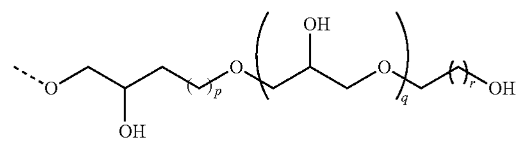

(4-2)

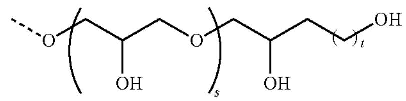

(4-3)

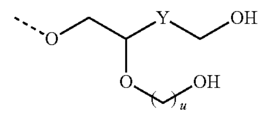

(In Formula (4-1), p represents an integer of 0 to 3, q represents an integer of 0 to 2, and r represents an integer of 1 to 5. A total value of p and r is 1 to 5.)

(In Formula (4-2), s represents an integer of 0 to 2, and t represents an integer of 0 to 5.)

(In Formula (4-3), u represents an integer of 2 to 4. Y represents a linear alkylene group which may have an ether oxygen atom, or a single bond. In a case where Y is the alkylene group, a total number of carbon atoms and oxygen atoms contained in Y is 1 to 5.)

In the terminal group represented by Formula (4-1), the linking group between the carbon atom to which the terminal hydroxy group is bonded and the carbon atom to which the hydroxy group adjacent to the terminal hydroxy group is bonded includes an ether oxygen atom. p in Formula (4-1) represents an integer of 0 to 3, r represents an integer of 1 to 5, and the total value of p and r is 1 to 5. Therefore, the linking group has a linear structure composed of 3 to 7 atoms including a carbon atom to which a hydroxy group is not bonded.

In the terminal group represented by Formula (4-1), since the linking group has a linear structure composed of three or more atoms including an ether oxygen atom and a carbon atom to which a hydroxy group is not bonded, the distance between the terminal hydroxy group and the hydroxy group adjacent to the terminal hydroxy group is appropriate. Therefore, it is possible to suppress the interaction between the terminal hydroxy group and the hydroxy group adjacent to the terminal hydroxy group in the molecule, and both the terminal hydroxy group and the hydroxy group adjacent to the terminal hydroxy group can closely adhere to the protective layer. In addition, since the linking group has a linear structure composed of three or more atoms, the mobility of the molecule is appropriate, and intramolecular aggregation is less likely to occur.

Since the linking group has a linear structure including an ether oxygen atom and composed of 7 or less atoms including a carbon atom to which a hydroxy group is not bonded, the hydrophobicity of the linking group is not too high, and thus the adhesion to the protective layer is not impaired. From these, the lubricating layer containing the fluorine-containing ether compound having the terminal group represented by Formula (4-1) has excellent adhesion to the protective layer, excellent chemical substance resistance, and a high spin-off suppression effect.

In Formula (4-1), the total value of p and r is 1 to 5, and preferably 1 to 3. In the terminal group D, the carbon atoms included in the linking group disposed between the carbon atoms to which the hydroxy group is bonded prevent intramolecular interaction between the hydroxy groups from occurring preferentially over the interaction between the hydroxy group and the protective layer, and improve the adhesion between the hydroxy group in the terminal group D and the protective layer. On the other hand, in a case where the number of the carbon atoms included in the linking group is too large, the flexibility of the terminal group D deteriorates, and it may be difficult to uniformly coat the protective layer. In the terminal group represented by Formula (4-1), since the total value of p and r is 5 or less, the alkylene chain of the main chain portion of the terminal group D is not too long. Therefore, since the long rigid alkylene chain degrades the flexibility of the terminal portion and weakens the interaction with the protective layer, it is possible to prevent the terminal portion from floating. Furthermore, since the alkylene chain of the main chain portion of the terminal group D is not too long, a spot having a high surface free energy, which is composed of a portion having a larger number of carbon atoms than the number of fluorine atoms, is less likely to be generated in the lubricating layer containing the fluorine-containing ether compound. Therefore, it is possible to form a lubricating layer in which contamination by a chemical contaminant is less likely to occur. p is preferably 0 or 1 and more preferably 0. r is preferably 1 or 2, and more preferably 1.

In Formula (4-1), q represents an integer of 0 to 2. The number of hydroxy groups in Formula (4-1) is q+2, and as described above, the number of hydroxy groups contained in D is preferably 2 or 3, and most preferably 2. Therefore, q in Formula (4-1) is preferably 0 or 1, and more preferably 0.

In a case where q in Formula (4-1) is 0 and the total value of p and r is 2 or more, p is preferably 1 or more. This is because the ether oxygen atom is disposed at a position close to the primary hydroxy group in Formula (4-1), the flexibility of the movement of the primary hydroxy group is improved, and the interaction between the primary hydroxy group and the protective layer is further strengthened.

In the terminal group D represented by Formula (4-2), the linking group between the carbon atom to which the terminal hydroxy group is bonded and the carbon atom to which the hydroxy group adjacent to the terminal hydroxy group is bonded does not include an ether oxygen atom. t in Formula (4-2) represents an integer of 0 to 5. Therefore, the linking group has a single bond (a carbon atom to which a terminal hydroxy group is bonded and a carbon atom to which a hydroxy group adjacent to the terminal hydroxy group is bonded are directly bonded) or has a linear structure composed of 1 to 5 atoms including a carbon atom to which a hydroxy group is not bonded. Therefore, the distance between the terminal hydroxy group and the hydroxy group adjacent to the terminal hydroxy group is appropriate, the interaction between the hydroxy groups and the protective layer is supported, and the adhesion to the protective layer is excellent.

In the terminal group D represented by Formula (4-2), since t is 5 or less, the alkylene chain of the main chain portion of D is not too long. Therefore, since the rigidity of the alkylene chain is long, the flexibility of the terminal portion deteriorates, the interaction with the protective layer is weakened, the terminal portion can be prevented from floating, and the protective layer can be uniformly coated. Furthermore, since t is 5 or less, it is difficult for a spot having a high surface free energy, which is formed of a portion having a larger number of carbon atoms than the number of fluorine atoms, to be generated in the lubricating layer containing the fluorine-containing ether compound. Therefore, the surface free energy of the lubricating layer is low, and contamination by a chemical contaminant can be prevented. t is preferably 0 to 4, more preferably 0 to 2, and still more preferably 0 or 1.

In the terminal group D represented by Formula (4-2), since the above-described linking group is a single bond or a linear structure which does not contain an ether oxygen atom, contains a hydroxy group-bonded carbon atom and is composed of 1 to 5 atoms, the hydrophobicity of the linking group is not too high, and thus the adhesion to the protective layer is not impaired.

From these facts, the lubricating layer containing the fluorine-containing ether compound having the terminal group represented by Formula (4-2) has excellent adhesion to the protective layer, excellent chemical substance resistance, and a high spin-off suppression effect.

In Formula (4-2), s represents an integer of 0 to 2. The number of polar groups in Formula (4-2) is s+2, and as described above, the number of polar groups contained in the terminal group D is preferably 2 or 3, and most preferably 2. Therefore, s in Formula (4-2) is preferably 0 or 1, and more preferably 0.

The terminal group D represented by Formula (4-3) does not have a secondary hydroxy group and has two primary hydroxy groups at the terminal. In a case where the hydroxy group included in the terminal group D is a primary hydroxy group, the hydroxy group is more likely to participate in the interaction with the active site on the protective layer, as compared with a case where the hydroxy group is a secondary hydroxy group. The terminal group represented by Formula (4-3) has no secondary hydroxy groups and has only two primary hydroxy groups that easily interact with the active points on the protective layer. Therefore, in a case where the terminal group D is the terminal group represented by Formula (4-3), the fluorine-containing ether compound can form a lubricating layer having good adhesion to the protective layer.

In the terminal group represented by Formula (4-3), the linking group between carbon atoms to which two primary hydroxy groups are each bonded includes a carbon atom to which a hydroxy group is not bonded and an ether oxygen atom. u in Formula (4-3) represents an integer of 2 to 4. Y represents a linear alkylene group which may have an ether oxygen atom, or a single bond. In a case where Y is the alkylene group, the total number of carbon atoms and oxygen atoms contained in Y is 1 to 5. Therefore, the linking group has a structure composed of 3 to 10 atoms including a carbon atom to which a hydroxy group is not bonded and an ether oxygen atom.

In the terminal group represented by Formula (4-3), since the linking group has a structure composed of three or more atoms including an ether oxygen atom and a carbon atom to which a hydroxy group is not bonded, the distance between two primary hydroxy groups is appropriate. Therefore, the hydroxy groups can support the interaction with the protective layer each other. Therefore, the fluorine-containing ether compound can form a lubricating layer having good adhesion to the protective layer.

In the terminal group represented by Formula (4-3), since the above-described linking group is a structure including an ether oxygen atom and composed of 10 or less atoms including a carbon atom to which a hydroxy group is not bonded, the hydrophobicity of the linking group is not too high, and thus the adhesion to the protective layer is not impaired. Furthermore, in the lubricating layer containing the fluorine-containing ether compound, a spot having a high surface free energy, which is composed of a portion having a larger number of carbon atoms than the number of fluorine atoms, is less likely to be generated, and the surface free energy of the lubricating layer is low. Therefore, the lubricating layer containing the fluorine-containing ether compound having the terminal group represented by Formula (4-3) has excellent adhesion to the protective layer, excellent chemical substance resistance, and a high spin-off suppression effect.

Since u in Formula (4-3) is 2 or more, the distance from a bulky site such as the primary hydroxy group included in $—O—(CH_2)_u—OH$ (hereinafter, sometimes referred to as a "side chain portion") in Formula (4-3), the PFPE chain represented by B bonded to the terminal group D through a methylene group, and the tertiary carbon atom to which the side chain portion of Formula (4-3) is bonded is sufficiently long. Therefore, the primary hydroxy group included in the side chain portion of Formula (4-3) can easily move freely. In addition, since u is 4 or less, the flexibility of the side chain portion in Formula (4-3) is maintained. In addition, in the lubricating layer containing the fluorine-containing ether compound, a spot having a high surface free energy, which is composed of a portion having a larger number of carbon atoms than the number of fluorine atoms, is less likely to be generated, and the surface free energy of the lubricating layer is low. Therefore, the fluorine-containing ether compound can form a lubricating layer having excellent adhesion to the protective layer, exhibiting excellent chemical substance resistance, and having a high spin-off suppression effect. u is preferably 2 or 3 and more preferably 2.

In Formula (4-3), the primary hydroxy group included in $—Y—CH_2—OH$ is bonded to the carbon atom to which the side chain portion of Formula (4-3) is bonded through $—Y—CH_2—$. Therefore, the primary hydroxy group included in $—Y—CH_2—OH$ is likely to move freely and is likely to participate in the interaction with the active point on the protective layer.

Since the primary hydroxy group included in $—Y—CH_2—OH$ in Formula (4-3) is more likely to participate in the interaction with the active site on the protective layer, it is preferable that Y in Formula (4-3) is a linear alkylene group which is not a single bond and may have an ether oxygen atom. In this case, this is because the distance between the primary hydroxy group included in $—Y—CH_2—OH$ and the bulky site such as the PFPE chain represented by B bonded to the terminal group D through a methylene group or the tertiary carbon atom to which the side chain portion of Formula (4-3) is bonded is increased, and the primary hydroxy group included in $—Y—CH_2—OH$ is more likely to move freely.

In Formula (4-3), in a case where Y is a linear alkylene group which may have an ether oxygen atom, the total number of the carbon atoms and the oxygen atoms contained in Y is 1 to 5. In the terminal group represented by Formula (4-3), the total number of the carbon atoms and the oxygen atoms contained in Y is 5 or less, so that the alkylene chain of the main chain portion in Formula (4-3) is not too long. Therefore, since the long rigid alkylene chain degrades the flexibility of the terminal portion and weakens the interaction with the protective layer, it is possible to prevent the terminal portion from floating. Furthermore, in the lubricating layer containing the fluorine-containing ether compound, a spot having a high surface free energy, which is composed of a portion having a larger number of carbon atoms than the number of fluorine atoms, is less likely to be generated, and the surface free energy of the lubricating layer is low. The total number of the carbon atoms and the oxygen atoms contained in Y is preferably 1 to 4 and more preferably 1 to 3. The number of the carbon atoms contained in Y is preferably 1 to 3 and more preferably 1 to 2.

Specific examples of Y in a case where Y in Formula (4-3) is a linear alkylene group which may have an ether oxygen atom include $—CH_2—$, $—CH_2CH_2—$, $—CH_2CH_2CH_2—$, $—CH_2OCH_2—$, $—CH_2OCH_2CH_2—$, $—CH_2OCH_2CH_2CH_2—$, and $—CH_2CH_2OCH_2—$.

(PFPE Chain Represented by B)

In the fluorine-containing ether compound represented by General Formula (1), B is a perfluoropolyether chain. In a case where a lubricant containing the fluorine-containing ether compound of the present embodiment is applied onto the protective layer to form a lubricating layer, the PFPE chain represented by B coats the surface of the protective layer and imparts lubricity to the lubricating layer to reduce the frictional force between the magnetic head and the protective layer. The PFPE chain represented by B is appropriately selected depending on the performance or the like required for the lubricant including the fluorine-containing ether compound.

Three B's may be the same in part or in whole, or may be different from each other. It is preferable that all of three B's are the same as one another. This is because the coating state of the fluorine-containing ether compound with respect to the protective layer becomes more uniform, and the lubricating layer has better adhesion. Two or more B's among three B's being the same as one another means that two or more B's having the same structure of the repeating unit of the PFPE chain are included among three B's. The same B's also includes B's having the same structure of the repeating unit but different average degrees of polymerization.

Examples of the PFPE chain represented by B include chains composed of a polymer or copolymer of a perfluoroalkylene oxide. Examples of the perfluoroalkylene oxide include perfluoromethylene oxide, perfluoroethylene oxide, perfluoro-n-propylene oxide, perfluoroisopropylene oxide, and perfluorobutylene oxide.

It is preferable that three B's in General Formula (1) are each independently, for example, a PFPE chain represented by Formula (5) derived from a polymer or copolymer of a perfluoroalkylene oxide.

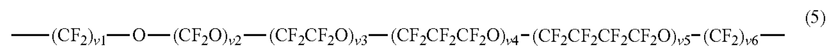

(5)

(In Formula (5), v2, v3, v4, and v5 represent average degrees of polymerization, and each independently represent 0 to 20. Here, all of v2, v3, v4, and v5 are not 0 at the same time. v1 and v6 are average values representing the number of $CF_2$'s, and each independently represent 1 to 3. An order of arrangement of ($CF_2O$), ($CF_2CF_2O$), ($CF_2CF_2CF_2O$), and ($CF_2CF_2CF_2CF_2O$), which are repeating units in Formula (5), is not particularly limited.)

In Formula (5), v2, v3, v4, and v5 represent the average degrees of polymerization, each independently represent 0 to 20, and are preferably 0 to 15 and more preferably 0 to 10.

In Formula (5), v1 and v6 are the average values indicating the number of $CF_2$'s, and each independently represent 1 to 3. v1 and v6 are determined depending on the structure of the repeating unit disposed at the end part of the chain-like structure in the PFPE chain represented by Formula (5), and the like.

($CF_2O$), ($CF_2CF_2O$), ($CF_2CF_2CF_2O$), and ($CF_2CF_2CF_2CF_2O$) in Formula (5) are repeating units. The order of arrangement of the repeating units in Formula (5) is not particularly limited. In addition, the number of the kinds of repeating units in Formula (5) is not particularly limited.

It is preferable that three B's in General Formula (1) are each independently any one selected from PFPE chains represented by Formulae (5-1) to (5-4). In a case where three B's are each any one selected from the PFPE chains represented by Formulae (5-1) to (5-4), a fluorine-containing ether compound from which a lubricating layer having good lubricity can be obtained is obtained. In addition, in a case where three B's are each any one selected from the PFPE chains represented by Formulae (5-1) to (5-4), the proportion of the number of oxygen atoms (the number of ether bonds (—O—)) in the number of carbon atoms in the PFPE chain is appropriate. Therefore, the fluorine-containing ether compound has appropriate hardness. Therefore, the fluorine-containing ether compound applied onto the protective layer is less likely to aggregate on the protective layer, and a lubricating layer having a thinner thickness can be formed with a sufficient coating rate. In addition, the fluorine-containing ether compound has appropriate flexibility, whereby a lubricating layer having better chemical substance resistance can be formed.

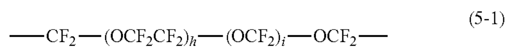

(5-1)

(In Formula (5-1), h and i represent average degrees of polymerization, h represents 1 to 20, and i represents 0 to 20.)

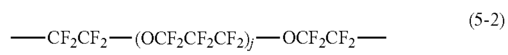

(5-2)

(In Formula (5-2), j represents an average degree of polymerization, and represents 1 to 15.)

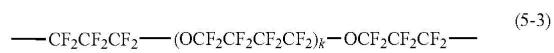

(5-3)

(In Formula (5-3), k represents an average degree of polymerization, and represents 1 to 10.)

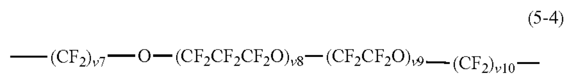

(5-4)

(In Formula (5-4), v8 and v9 represent average degrees of polymerization, and each independently represent 1 to 20. v7 and v10 are average values representing the number of $CF_2$'s, and each independently represent 1 to 2.)

In Formula (5-1), the order of arrangement of ($OCF_2CF_2$) and ($OCF_2$), which are repeating units, is not particularly limited. In Formula (5-1), the number h of ($OCF_2CF_2$)'s and the number i of ($OCF_2$)'s may be the same as or different from each other. The PFPE chain represented by Formula (5-1) may be a polymer of ($OCF_2CF_2$). In addition, the PFPE chain represented by Formula (5-1) may be any one of a random copolymer, block copolymer, or alternating copolymer composed of ($OCF_2CF_2$) and ($OCF_2$).

In Formulae (5-1) to (5-3), since h indicating the average degree of polymerization is 1 to 20, i is 0 to 20, j is 1 to 15, and k is 1 to 10, a fluorine-containing ether compound from which a lubricating layer having good lubricity can be obtained is obtained. In addition, in Formulae (5-1) to (5-3), since h and i indicating the average degrees of polymerization are 20 or less, j is 15 or less, and k is 10 or less, the viscosity of the fluorine-containing ether compound does not become excessively high, and it is easy to apply a lubricant including this fluorine-containing ether compound, which is preferable. Since a fluorine-containing ether compound, which easily wets and spreads on the protective layer and makes it easy for a lubricating layer having a uniform film thickness to be obtained, is obtained, h, i, j, and k representing the average degrees of polymerization are preferably 1 to 10, more preferably 1.5 to 8, and still more preferably 2 to 7.

Furthermore, in Formula (5-1), it is particularly preferable that h representing the average degree of polymerization is 4 to 5 and i representing the average degree of polymerization is 4 to 5. In a case where h and i are 4 or more, the spin-off resistance is further improved. In addition, in a case where h and i are 5 or less, the coatability of the lubricating layer to the protective layer is improved, and the chemical substance resistance is further improved.

In addition, in Formula (5-1), in a case where i representing the average degree of polymerization is 0 and h representing the average degree of polymerization is 6 to 8, a lubricating layer having good chemical substance resistance and good spin-off resistance is obtained, which is preferable. In addition, in Formula (5-2), it is preferable that j representing the average degree of polymerization is 3.5 to 5.0, since a lubricating layer having good chemical substance resistance and good spin-off resistance is obtained.

In Formula (5-4), the order of arrangement of ($CF_2CF_2CF_2O$) and ($CF_2CF_2O$), which are repeating units, is not particularly limited. In Formula (5-4), the number v8 of ($CF_2CF_2CF_2O$)'s and the number v9 of ($CF_2CF_2O$)'s may be the same as or different from each other. Formula (5-4) may a PFPE chain containing any one of a random copolymer, block copolymer, or alternating copolymer composed of monomer units ($CF_2CF_2CF_2O$) and ($CF_2CF_2O$).

In Formula (5-4), v8 and v9 representing the average degrees of polymerization are each independently 1 to 20, preferably 1 to 15, and more preferably 1 to 10. v7 and v10 in Formula (5-4) are the average values indicating the number of $CF_2$'s, and each independently represent 1 to 2. v7 and v10 are determined depending on the structure of the repeating unit disposed at the end part of the chain-like structure in the PFPE chain represented by Formula (5-4), and the like.

In the fluorine-containing ether compound represented by General Formula (1), it is preferable that three A's in General Formula (1) are the same as one another, three B's are the same, and three D's are the same as one another. That is, it is preferable that three -A-$CH_2$—B—$CH_2$-D's in General Formula (1) are the same as one another. This is because the fluorine-containing ether compound can be easily and efficiently produced.

Specifically, the fluorine-containing ether compound represented by General Formula (1) is preferably any of compounds represented by Formulae (AA) to (AU) and (BA) to (BD). In a case where the compound represented by Formula (1) is any of compounds represented by Formulae (AA) to (AU) and (BA) to (BD), a raw material is easily available, and a lubricating layer having a more excellent chemical resistance even in a case where the thickness is thin can be formed, which has a higher spin-off suppression effect on the magnetic recording medium.

In all of the compounds represented by Formulae (AA) to (AH), (AJ) to (AU), and (BA) to (BD), three -A-$CH_2$—B—$CH_2$-D's in General Formula (1) are the same as one another. In the compounds represented by Formulae (AA) to (AU) and (BA) to (BD), $Rf_1$, $Rf_2$, and $Rf_3$ representing PFPE chains each have the following structure. That is, in the compounds represented by Formulae (AA) to (AQ), (AT), (AU), and (BA) to (BD), $Rf_1$ is the PFPE chain represented by Formula (5-1). In the compound represented by Formula (AR), $Rf_2$ is the PFPE chain represented by Formula (5-2). In the compound represented by Formula (AS), $Rf_3$ is the PFPE chain represented by Formula (5-3). Since h and i in $Rf_1$ representing the PFPE chains in Formulae (AA) to (AU) and (BA) to (BD), j in $Rf_2$, and k in $Rf_3$ are values indicating the average degrees of polymerization, these values are not necessarily integers.

[Chemical Formula 9]

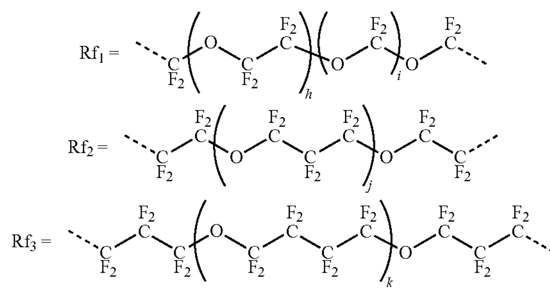

In all of the compounds represented by Formulae (AA) to (AU) and (BA) to (BD), X represents the linking group represented by any of Formulae (2-1) to (2-5). In all of the compounds represented by Formulae (AA) to (AU) and (BA) to (BD), A is the linking group represented by Formula (3-1) or (3-2). In all of the compounds represented by Formulae (AA) to (AU) and (BA) to (BD), D's are each the terminal group represented by any of Formulae (4-1) to (4-3).

[Chemical Formula 10]

(AA)

(AB)

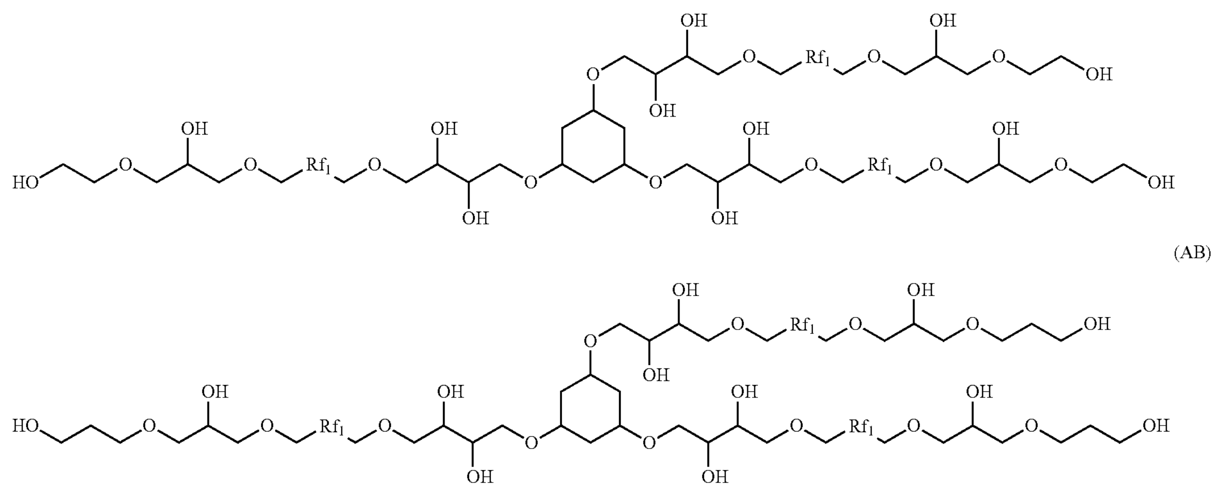

-continued (AC)

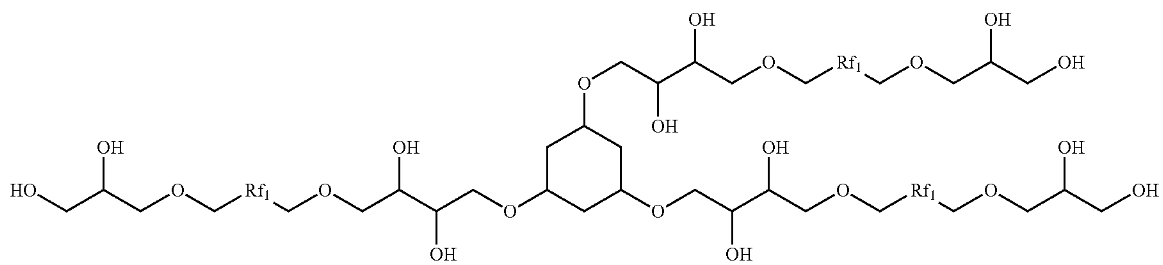

(AD)

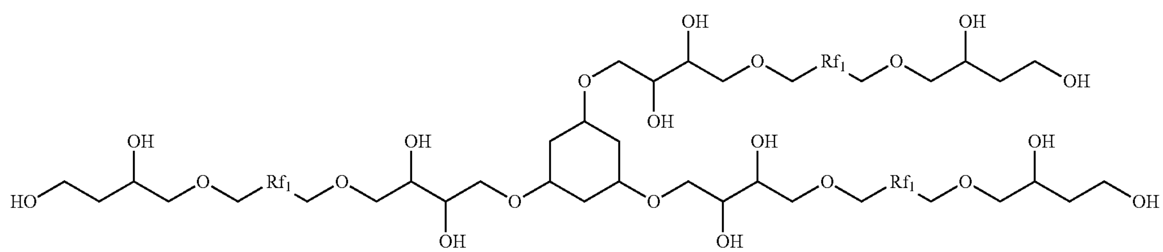

(In three $Rf_1$'s in Formula (AA), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AB), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AC), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AD), h and i represent the average degrees of polymerization, h represents 1 to 20, and i represents 0 to 20. H's and 's in three $Rf_1$'s may be different from each other or may be the same in part or in whole.)

[Chemical Formula 11]

(AE)

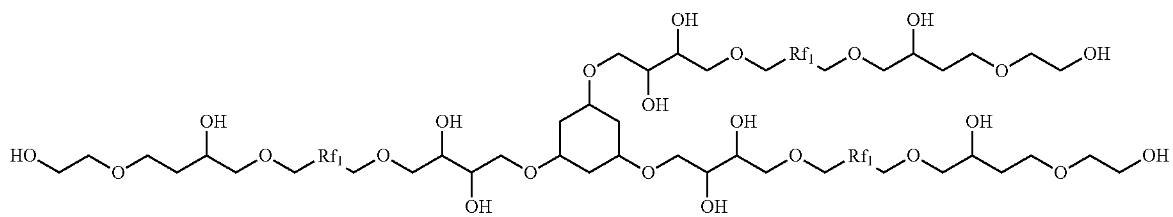

(AF)

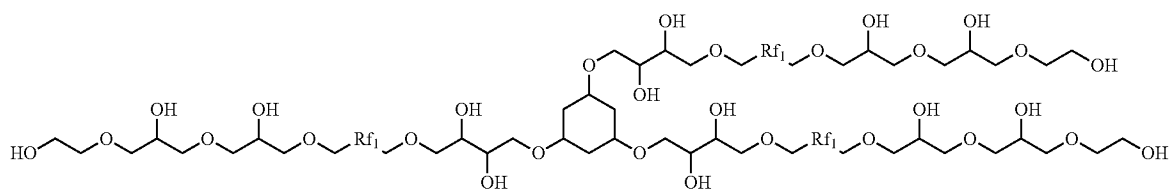

(AG)

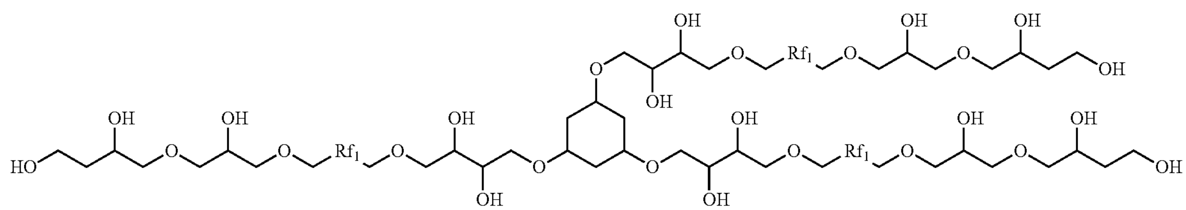

-continued (AH)

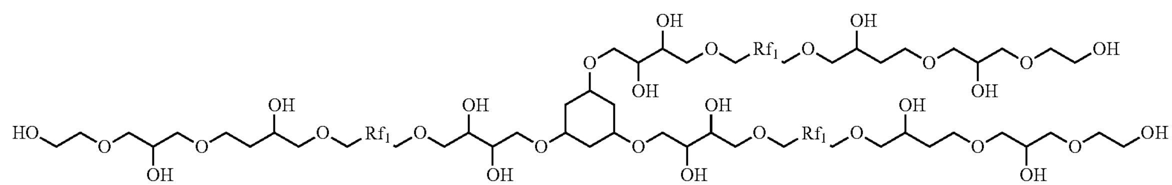

(In three $Rf_1$'s in Formula (AF), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AF), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AG), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AH), h and i represent the average degrees of polymerization, h represents 1 to 20, and i represents 0 to 20. H's and 's in three $Rf_1$'s may be different from each other or may be the same in part or in whole.)

[Chemical Formula 12]

(AI)

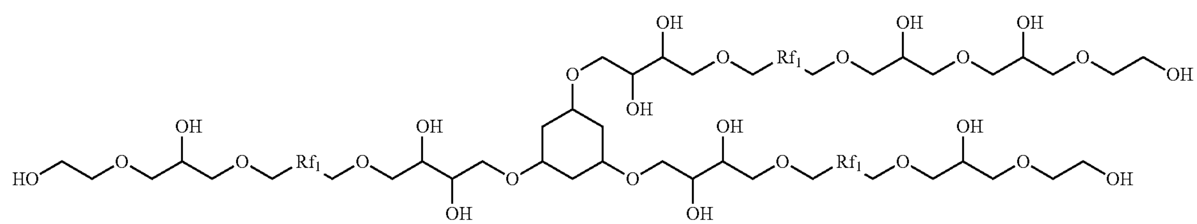

(AJ)

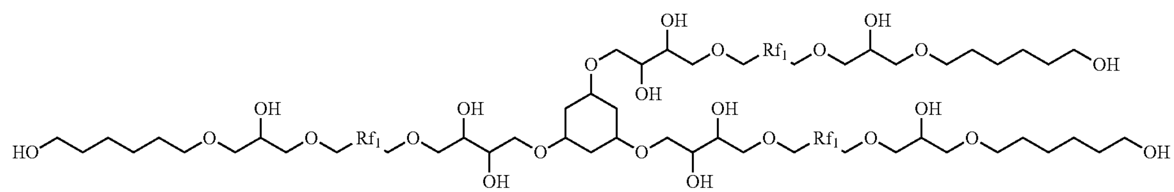

(AK)

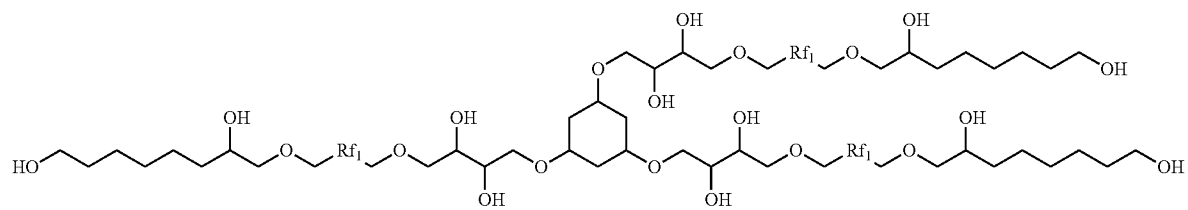

(AL)

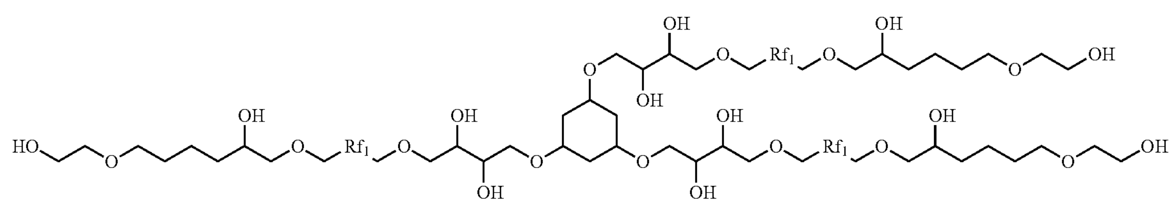

(In three $Rf_1$'s in Formula (AI), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AJ), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AK), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AL), h and i represent the average degrees of polymerization, h represents 1 to 20, and i represents 0 to 20. H's and 's in three $Rf_1$'s may be different from each other or may be the same in part or in whole.)

[Chemical Formula 13]

(AM)

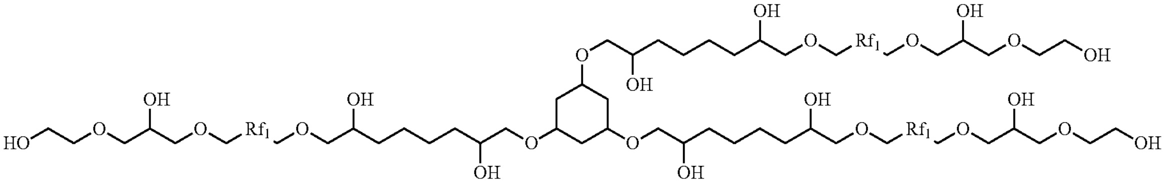

(AN)

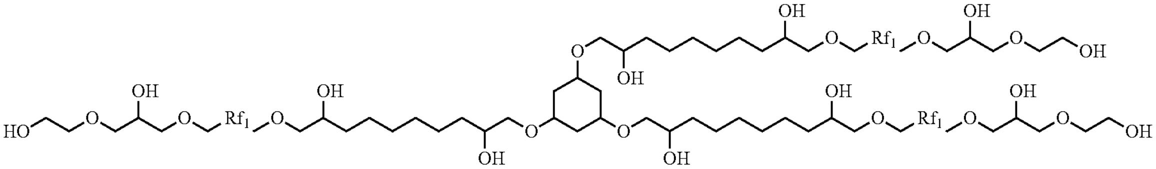

(AO)

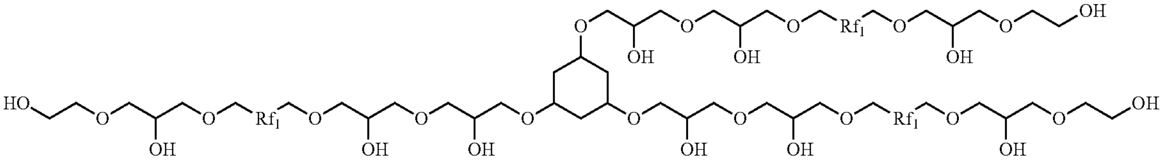

(AP)

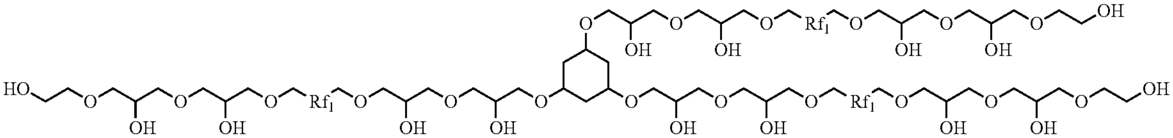

(In three $Rf_1$'s in Formula (AM), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AN), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AO), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AP), h and i represent the average degrees of polymerization, h represents 1 to 20, and i represents 0 to 20. H's and 's in three $Rf_1$'s may be different from each other or may be the same in part or in whole.)

[Chemical Formula 14]

(AQ)

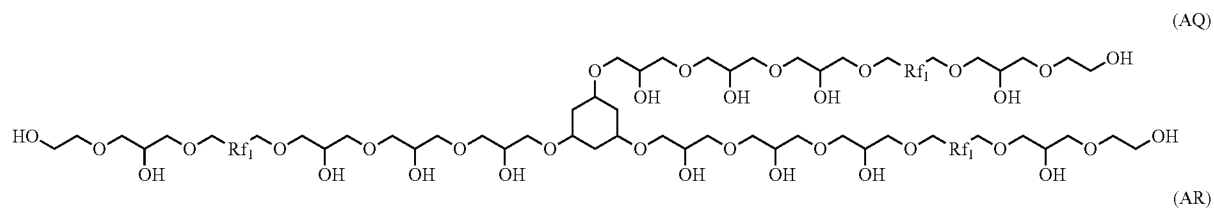

(AR)

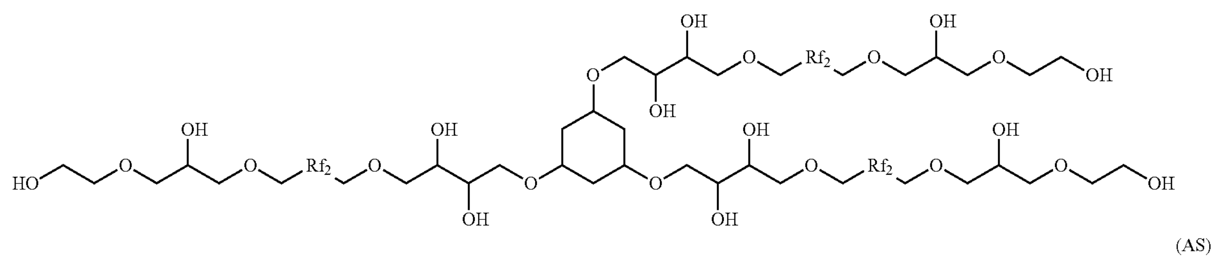

(AS)

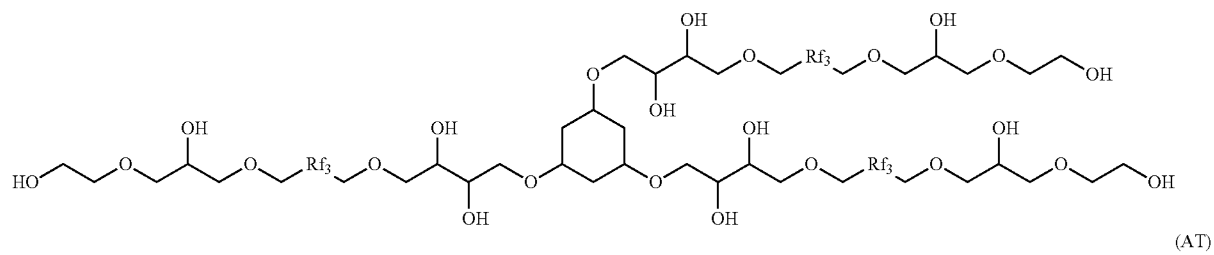

(AT)

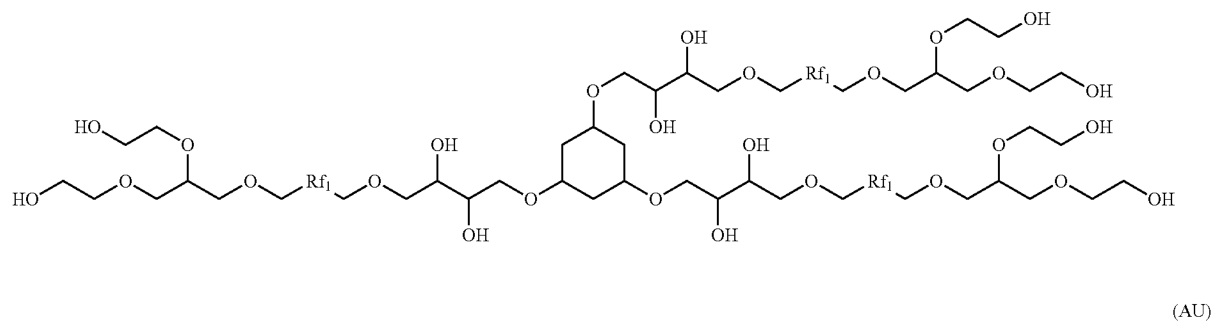

(AU)

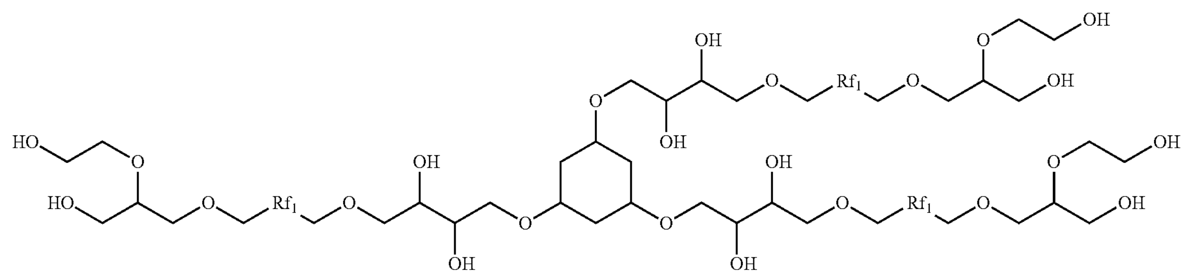

(In three $Rf_1$'s in Formula (AQ), h and i represent the average degrees of polymerization, h represents 1 to 20, and i represents 0 to 20. H's and 's in three $Rf_1$'s may be different from each other or may be the same in part or in whole.)

(In three $Rf_2$'s in Formula (AR), j represents the average degree of polymerization and represents 1 to 15. j's in three $Rf_2$'s may be different from each other, or may be the same in part or in whole.)

(In three $Rf_3$'s in Formula (AS), k represents the average degree of polymerization and represents 1 to 10. k's in three $Rf_3$'s may be different from each other, or may be the same in part or in whole.)

(In three $Rf_1$'s in Formula (AT), h and i represent the average degrees of polymerization, h represents 1 to 20, and i represents 0 to 20. H's and 's in three $Rf_1$'s may be different from each other or may be the same in part or in whole.)

(In three $Rf_1$'s in Formula (AU), h and i represent the average degrees of polymerization, h represents 1 to 20, and i represents 0 to 20. H's and 's in three $Rf_1$'s may be different from each other or may be the same in part or in whole.)

[Chemical Formula 15]

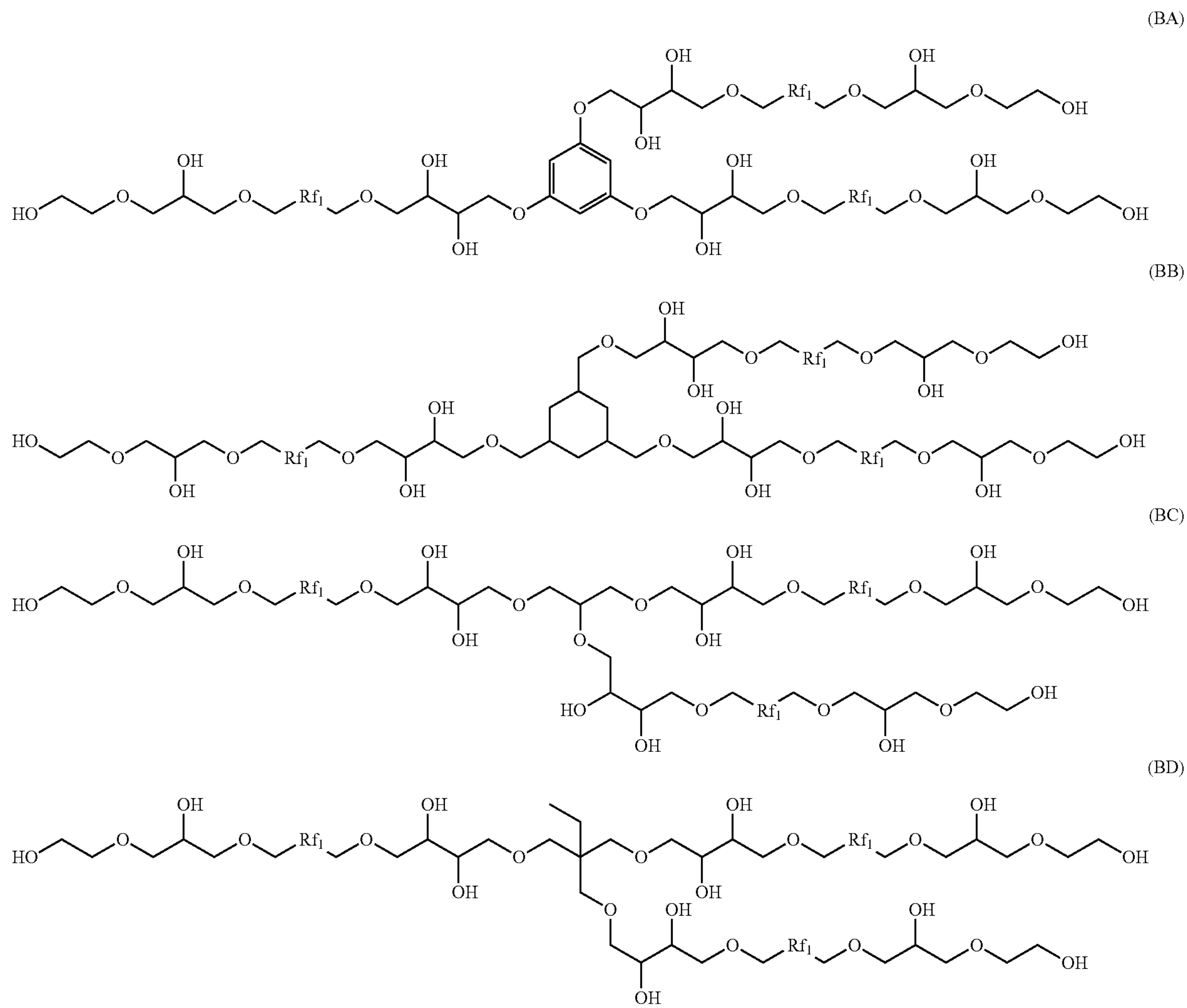

(In three $Rf_1$'s in Formula (BA), h's and i's represent the average degrees of polymerization, h represents 1 to 20, and i represents 0 to 20. H's and 's in three $Rf_1$'s may be different from each other or may be the same in part or in whole.)

(In three $Rf_1$'s in Formula (BB), h's and i's represent the average degrees of polymerization, h represents 1 to 20, and i represents 0 to 20. H's and 's in three $Rf_1$'s may be different from each other or may be the same in part or in whole.)

(In three $Rf_1$'s in Formula (BC), h's and i's represent the average degrees of polymerization, h represents 1 to 20, and i represents 0 to 20. H's and 's in three $Rf_1$'s may be different from each other or may be the same in part or in whole.)

(In three $Rf_1$'s in Formula (BD), h's and i's represent the average degrees of polymerization, h represents 1 to 20, and i represents 0 to 20. H's and 's in three $Rf_1$'s may be different from each other or may be the same in part or in whole.)

The number-average molecular weight (Mn) of the fluorine-containing ether compound of the present embodiment is preferably in a range of 500 to 10000, more preferably in a range of 1000 to 5000, still more preferably in a range of 2000 to 4800, and particularly preferably 3000 to 4600. In a case where the number-average molecular weight is 500 or more, a lubricating layer composed of the lubricant containing the fluorine-containing ether compound of the present embodiment has excellent heat resistance. The number-average molecular weight of the fluorine-containing ether compound is more preferably 1,000 or more. In addition, in a case where the number-average molecular weight is 10,000 or less, the viscosity of the fluorine-containing ether compound becomes appropriate, and a lubricating layer having a thin film thickness can be easily formed by applying a lubricant including the fluorine-containing ether compound. The number-average molecular weight of the fluorine-containing ether compound is preferably 5,000 or less since the viscosity is easy to handle in the case of being applied to a lubricant.

The number-average molecular weight (Mn) of the fluorine-containing ether compound is a value measured by $^{1}H$-NMR and $^{19}F$-NMR using AVANCE III 400 manufactured by Bruker Biospin. Specifically, the number of repeating units of the PFPE chain is calculated from the integral value measured by $^{19}F$-NMR, and the number-average molecular weight is determined. In the measurement of nuclear magnetic resonance (NMR), the measurement is performed by diluting a sample in a hexafluorobenzene/d-acetone (4/1 v/v) solvent. As the reference of the $^{19}F$-NMR chemical shift, the peak of hexafluorobenzene is set to −164.7 ppm for, and as the reference of the $^1$H-NMR chemical shift, the peak of acetone is set to 2.2 ppm.

In the fluorine-containing ether compound of the present embodiment, it is preferable that the polydispersity (weight-average molecular weight (Mw)/number-average molecular weight (Mn) ratio) is set to 1.3 or less by cutting off the molecular weight by an appropriate method.

In the present embodiment, a method for cutting off the molecular weight is not particularly limited, and for example, molecular weight cutting-off by a silica gel column chromatography method, a gel permeation chromatography (GPC) method, or the like, molecular weight cutting-off by a supercritical extraction method, or the like can be used.

[Production Method]

A method for producing the fluorine-containing ether compound of the present embodiment is not particularly limited, and the fluorine-containing ether compound can be produced using a known production method in the related art. The fluorine-containing ether compound of the present embodiment can be produced by, for example, the following production method.

[First Production Method]

(A Case where D is the Terminal Group Represented by Formula (4-1) or (4-2))

A fluorine-based compound in which hydroxymethyl groups ($-CH_2OH$) are disposed at both terminals of a perfluoropolyether chain corresponding to B in General Formula (1) is prepared.

Next, a hydroxy group of a hydroxymethyl group disposed at one terminal of the fluorine-based compound is reacted with an epoxy compound having a group corresponding to D in General Formula (1) (first reaction). As a result, an intermediate compound 1-1 having the group corresponding to D at one terminal of the perfluoropolyether chain corresponding to B is obtained.

As the epoxy compound having a group corresponding to D in General Formula (1), for example, compounds represented by Formulae (6-1) to (6-11) can be used. THP in Formulae (6-1) to (6-11) represents a tetrahydropyranyl group. The compounds represented by Formulae (6-1) to (6-11) can be produced by a known method.

[Chemical Formula 16]

(6-1)

(6-2)

(6-3)

(6-4)

(6-5)

(6-6)

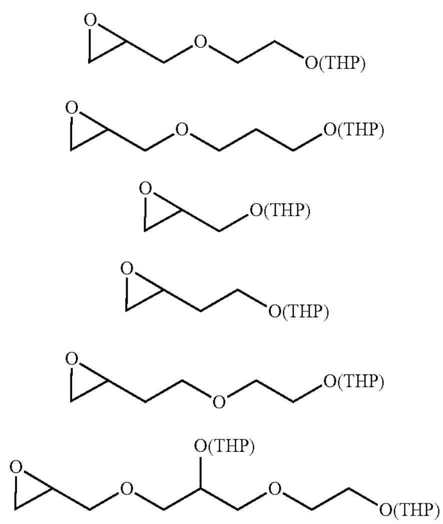

-continued (6-7)

(6-8)

(6-9)

(6-10)

(6-11)

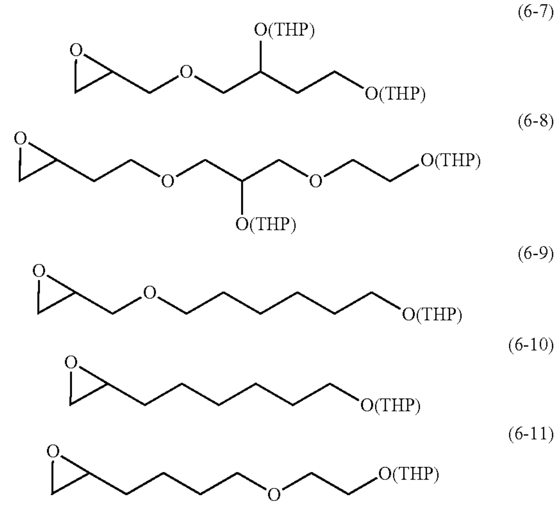

The epoxy compound having a group corresponding to D in General Formula (1) can be produced, for example, by the following method. That is, as shown in Formula (7-1), the compound can be produced using a method of reacting an alcohol having a structure corresponding to a part of a terminal group represented by D in General Formula (1) (R in Formula (7-1)) with a halogen compound such as a bromine compound or chlorine compound having an epoxy group (Formula (7-1) is a case where the halogen compound is a bromine compound). Before the alcohol is reacted with the 10 halogen compound having an epoxy group, a hydroxy group contained in R of the alcohol represented by R—OH may be protected by a known method. The number of methylene groups contained in the halogenated compound having an epoxy group (a1 in Formula (7-1)) is 1 to 4, and can be appropriately determined depending on the structure of the terminal group of the compound to be synthesized.

[Chemical Formula 17]

(7-1)

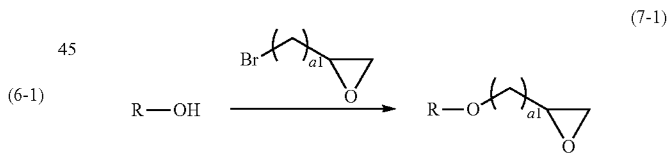

(In Formula (7-1), R represents a structure corresponding to a part of the terminal group represented by D in General Formula (1). a1 represents an integer of 1 to 4.)

The epoxy compound may be produced by the following method. That is, as shown in Formula (7-2), an alcohol having a structure corresponding to a part of a terminal group represented by D in General Formula (1) (R in Formula (7-2)) is reacted with a halogen compound such as a bromine compound or chlorine compound having an alkenyl group (Formula (7-2) is a case where the halogen compound is a bromine compound). Thereafter, the obtained compound is oxidized by the action of m-chloroperoxybenzoic acid (mCPBA). The epoxy compound can be produced by this method. Before the alcohol is reacted with the halogen compound having an alkenyl group, a hydroxy group contained in R of the alcohol represented by R—OH may be protected by a known method. The number of methylene groups contained in the halogenated compound having an alkenyl group (a2 in Formula (7-2)) is 1 to 4, and can be appropriately determined depending on the structure of the terminal group of the compound to be synthesized.

[Chemical Formula 18]

(7-2)

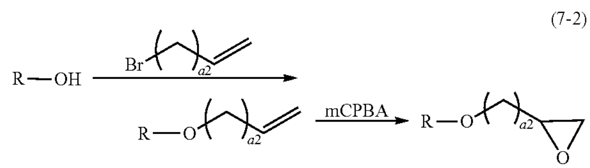

(In Formula (7-2), R represents a structure corresponding to a part of the terminal group represented by D in General Formula (1). a2 represents an integer of 1 to 4.)

The epoxy compound may be produced by the following method. That is, as shown in Formula (7-3), an alcohol having a structure corresponding to a part of the terminal group represented by D in General Formula (1) (R in Formula (7-3)) is subjected to an addition reaction with a compound having an alkenyl group and an epoxy group. Thereafter, the compound obtained by the addition reaction is oxidized by the action of m-chloroperoxybenzoic acid (mCPBA). The epoxy compound can be produced by this method. A hydroxy group generated by the addition reaction may be protected by a known method before the compound obtained by the addition reaction is oxidized by the action of m-chloroperbenzoic acid (mCPBA). The number of methylene groups contained in the compound having an alkenyl group and an epoxy group (a3 in Formula (7-3)) is 1 to 4, and can be appropriately determined depending on the structure of the terminal group of the compound to be synthesized.

[Chemical Formula 19]

(7-3)

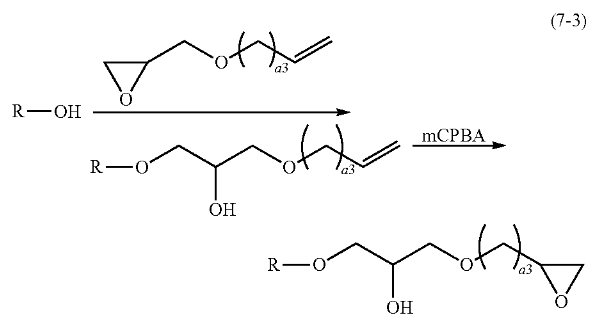

(In Formula (7-3), R represents a structure corresponding to a part of the terminal group represented by D in General Formula (1). a3 represents an integer of 1 to 4.)

Thereafter, a terminal hydroxy group of the intermediate compound 1-1 generated in the first reaction described above is subjected to an addition reaction with a compound having two epoxy groups corresponding to A in General Formula (1) to obtain an intermediate compound 1-2 (second reaction).

As the compound having two epoxy groups corresponding to A in General Formula (1), for example, compounds represented by Formulae (8-1) to (8-5) can be used. THP in Formula (8-5) represents a tetrahydropyranyl group.

[Chemical Formula 20]

(8-1)

(8-2)

(8-3)

(8-4)

(8-5)

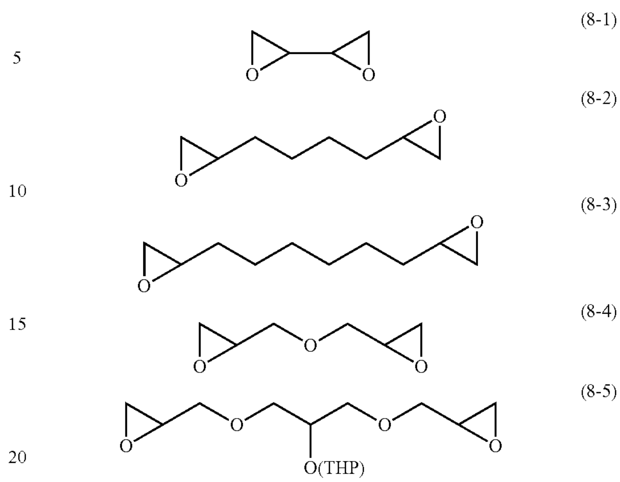

The compound having two epoxy groups corresponding to A in General Formula (1) can be produced by the following method. For example, a compound represented by Formula (8-4) can be produced by a method of oxidizing an alkenyl group of a compound having an alkenyl group and an epoxy group (allyl glycidyl ether) by the action of m-chloroperbenzoic acid (mCPBA) as shown in Formula (9-1).

[Chemical Formula 21]

(9-1)

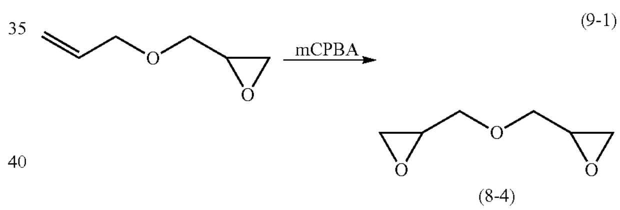

(8-4)

The compound represented by Formula (8-5) can be produced by a method shown in Formula (9-2). A halogen compound such as a bromine compound or a chlorine compound having an epoxy group (Formula (9-2) is a case where the halogen compound is a bromine compound) is reacted with an alcohol having an alkenyl group (allyl alcohol). Then, a secondary hydroxy group contained in the compound generated after the reaction is protected with dihydropyran, and the alkenyl group is oxidized by the action of m-chloroperbenzoic acid (mCPBA). THP in Formula (9-2) represents a tetrahydropyranyl group.

[Chemical Formula 22]

(9-2)

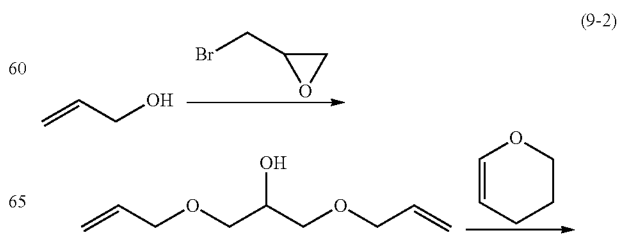

-continued

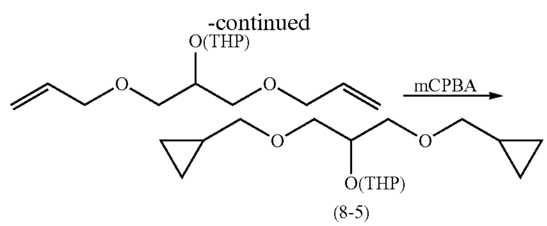

(8-5)

As the compound having two epoxy groups corresponding to A in General Formula (1), a commercially available product may be used.

A protective group, for example, a tetrahydropyranyl group is introduced into the secondary hydroxy group of the intermediate compound 1-2 having an epoxy group and a secondary hydroxy group, which has been generated in the above-described second reaction, and then a triol corresponding to X in General Formula (1) is reacted therewith (third reaction).

As the triol corresponding to X in General Formula (1), for example, 1,3,5-cyclohexanetriol, 1,3,5-benzenetriol, 1,3,5-cyclohexanetri methanol, glycerin, 2-methyl-1,2,3-propanetriol, trimethylolmethane, trimethylolethane, trimethylolpropane, and the like can be used.

After the above-described steps, a deprotection reaction is performed using a known method, whereby a compound represented by General Formula (1) in which three perfluoropolyether chains B are bonded to the trivalent atomic group X represented by Formulae (2-1) to (2-5) through the linking groups A represented by Formula (3-1) or (3-2), and the terminal group D is the terminal group represented by Formula (4-1) or (4-2) is obtained.

[Second Production Method]

(A Case where D is the Terminal Group Represented by Formula (4-3))

The intermediate compound 1-1 generated in the first reaction in the first production method has a terminal hydroxy group at one terminal of the perfluoropolyether chain and a secondary hydroxy group at the other terminal. After a protective group, for example, a tert-butyldimethylsilyl group has been introduced into this terminal hydroxy group, a halogen compound in which a hydroxy group in $—(CH_2)_u—OH$ of the terminal group represented by Formula (4-3) is protected is reacted with a secondary hydroxy group. Then, a deprotection reaction is performed on the protective group of the terminal hydroxy group using a known method, whereby an intermediate compound 2-1 is obtained (first reaction).

Examples of the halogenated compound in which the hydroxy group in $—(CH_2)_u—OH$ of the terminal group represented by Formula (4-3) is protected include compounds represented by Formulae (10-1) to (10-3). THP in Formulae (10-1) to (10-3) represents a tetrahydropyranyl group.

[Chemical Formula 23]

(10-1)

(10-2)

(10-3)

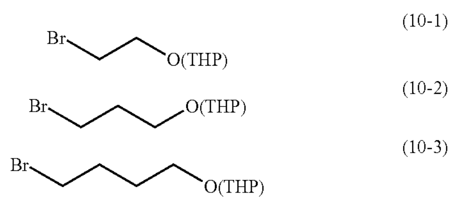

The obtained intermediate compound 2-1 is subjected to an addition reaction with a compound having two epoxy groups corresponding to A in General Formula (1) by the same method as in the second reaction of the first production method (second reaction). The obtained compound is subjected to an addition reaction with the triol corresponding to X in General Formula (1) by the same method as in the third reaction of the first production method (third reaction).

After the above-described steps, a deprotection reaction is performed using a known method, whereby a compound represented by General Formula (1) in which three perfluoropolyether chains B are bonded to the trivalent atomic group X represented by Formulae (2-1) to (2-5) through the linking groups A represented by Formula (3-1) or (3-2), and the terminal group D is the terminal group represented by Formula (4-3) is obtained.

[Third Production Method]

(A Case where at Least One of Three $-A-CH_2—B—CH_2-D$'s Bonded to X in General Formula (1) is Different)

Two or three kinds of intermediate compounds corresponding to $-A-CH_2—B—CH_2-D$ are synthesized by the same method as the first reaction and the second reaction of the first production method or the second production method. Thereafter, the triol corresponding to X in General Formula (1) and two or three kinds of intermediate compounds corresponding to $-A-CH_2—B—CH_2-D$ are sequentially reacted.

After the above-described steps, a deprotection reaction is performed using a known method, whereby a compound in which at least one of three pieces of $-A-CH_2—B—CH_2-D$ bonded to X in General Formula (1) is different can be produced.

[Lubricant for Magnetic Recording Medium]

A lubricant for a magnetic recording medium of the present embodiment contains the fluorine-containing ether compound represented by General Formula (1).

In the lubricant of the present embodiment, known materials used as materials for lubricants can be mixed and used as necessary as long as the characteristics are not impaired by the inclusion of the fluorine-containing ether compound represented by General Formula (1).

Specific examples of the known materials include FOMBLIN (registered trademark) ZDIAC, FOMBLIN ZDEAL, and FOMBLIN AM-2001 (all of which are manufactured by Solvay Solexis), and Moresco A20H (manufactured by Moresco Corporation). The known material used by being mixed with the lubricant of the present embodiment preferably has a number-average molecular weight of 1000 to 10000.

In a case where the lubricant of the present embodiment includes a material other than the fluorine-containing ether compound represented by General Formula (1), the content of the fluorine-containing ether compound represented by General Formula (1) in the lubricant of the present embodiment is preferably 50% by mass or more, and more preferably 70% by mass or more.

Since the lubricant of the present embodiment includes the fluorine-containing ether compound represented by General Formula (1), the lubricant has excellent chemical substance resistance and can form a lubricating layer having a high spin-off suppression effect.

[Magnetic Recording Medium]

A magnetic recording medium of the present embodiment has at least a magnetic layer, a protective layer, and a lubricating layer sequentially provided on a substrate.

In the magnetic recording medium of the present embodiment, one or two or more underlayers can be provided between the substrate and the magnetic layer as necessary. In addition, at least one of an adhesive layer and a soft magnetic layer can be provided between the underlayer and the substrate.

FIG. 1 is a schematic cross-sectional view showing one embodiment of a magnetic recording medium of the present invention.

A magnetic recording medium 10 of the present embodiment has a structure in which an adhesion layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate having a film made of NiP or a NiP alloy formed on a substrate made of a metal such as Al or an Al alloy or an alloy material can be used.

In addition, as the substrate 11, a non-magnetic substrate made of a non-metallic material such as glass, ceramics, silicon, silicon carbide, carbon, or a resin may be used, or a non-magnetic substrate having a film of NiP or a NiP alloy formed on a base made of these non-metallic materials may be used.

"Adhesion Layer"

The adhesion layer 12 prevents the progress of the corrosion of the substrate 11, which occurs in a case where the substrate 11 and the soft magnetic layer 13 provided on the adhesion layer 12 are disposed in contact with each other.

The material of the adhesion layer 12 can be appropriately selected from, for example, Cr, a Cr alloy, Ti, a Ti alloy, CrTi, NiAl, and an AlRu alloy. The adhesion layer 12 can be formed by, for example, a sputtering method.

"Soft Magnetic Layer"

The soft magnetic layer 13 preferably has a structure in which a first soft magnetic film, an interlayer made of a Ru film, and a second soft magnetic film are laminated in this order. That is, it is preferable that the soft magnetic layer 13 has a structure in which the soft magnetic films above and below the interlayer are anti-ferro-coupling (AFC) bonded by interposing the interlayer made of the Ru film between two soft magnetic films.

Examples of the material of the first soft magnetic film and the second soft magnetic film include a CoZrTa alloy and a CoFe alloy.

It is preferable that any one of Zr, Ta, or Nb is added to the CoFe alloy used for the first soft magnetic film and the second soft magnetic film. This makes the amorphization of the first soft magnetic film and the second soft magnetic film promoted. As a result, it becomes possible to improve the orientation of the first underlayer (seed layer) and to reduce the floating height of the magnetic head.

The soft magnetic layer 13 can be formed by, for example, a sputtering method.

"First Underlayer"

The first underlayer 14 is a layer that controls the orientations and crystal sizes of the second underlayer 15 and the magnetic layer 16 provided thereon.

Examples of the first underlayer 14 include layers made of a Cr layer, a Ta layer, a Ru layer, a CrMo alloy layer, a CoW alloy layer, a CrW alloy layer, a CrV alloy layer, or a CrTi alloy layer.

The first underlayer 14 can be formed by, for example, a sputtering method.

"Second Underlayer"

The second underlayer 15 is a layer that controls the orientation of the magnetic layer 16 to be good. The second underlayer 15 is preferably a layer made of Ru or a Ru alloy.

The second underlayer 15 may be a single layer or may be composed of a plurality of layers. In a case where the second underlayer 15 is made of a plurality of layers, all of the layers may be composed of the same material, or at least one layer may be composed of a different material.

The second underlayer 15 can be formed by, for example, a sputtering method.

"Magnetic Layer"

The magnetic layer 16 is made of a magnetic film in which the magnetization easy axis is oriented in a direction perpendicular or horizontal to the substrate surface. The magnetic layer 16 is a layer containing Co and Pt. In order to improve the SNR characteristics, the magnetic layer 16 may be a layer containing an oxide, Cr, B, Cu, Ta, Zr, or the like.

Examples of the oxide contained in the magnetic layer 16 include $SiO_2$, SiO, $Cr_2O_3$, CoO, $Ta_2O_3$, and $TiO_2$.

The magnetic layer 16 may be composed of one layer, or may be composed of a plurality of magnetic layers made of materials having different compositions.

For example, in a case where the magnetic layer 16 is made up of three layers of a first magnetic layer, a second magnetic layer, and a third magnetic layer, which are laminated in this order, the first magnetic layer is preferably a granular structure made of a material containing Co, Cr, and Pt, and further containing an oxide. As the oxide contained in the first magnetic layer, for example, an oxide of Cr, Si, Ta, Al, Ti, Mg, Co, or the like is preferably used. Among these, $TiO_2$, $Cr_2O_3$, $SiO_2$, and the like can be suitably used. In addition, the first magnetic layer is preferably made of a composite oxide obtained by adding two or more kinds of oxides. Among these, $Cr_2O_3$—$SiO_2$, $Cr_2O_3$—$TiO_2$, $SiO_2$—$TiO_2$, and the like can be suitably used.

The first magnetic layer can contain one or more elements selected from B, Ta, Mo, Cu, Nd, W, Nb, Sm, Tb, Ru, and Re, in addition to Co, Cr, Pt, and the oxide.

The same material as that of the first magnetic layer can be used for the second magnetic layer. The second magnetic layer is preferably a granular structure.

The third magnetic layer is preferably a non-granular structure made of a material containing Co, Cr, and Pt and not containing an oxide. The third magnetic layer can contain one or more elements selected from B, Ta, Mo, Cu, Nd, W, Nb, Sm, Tb, Ru, Re, and Mn, in addition to Co, Cr, and Pt.

In a case where the magnetic layer 16 is formed of a plurality of magnetic layers, it is preferable that a non-magnetic layer is provided between the adjacent magnetic layers. In a case where the magnetic layer 16 is made up of three layers of a first magnetic layer, a second magnetic layer, and a third magnetic layer, it is preferable to provide non-magnetic layers between the first magnetic layer and the second magnetic layer and between the second magnetic layer and the third magnetic layer.

As the non-magnetic layer provided between the adjacent magnetic layers in the magnetic layer 16, for example, Ru, a Ru alloy, a CoCr alloy, or a CoCrX1 alloy (X1 represents one or two or more elements selected from Pt, Ta, Zr, Re, Ru, Cu, Nb, Ni, Mn, Ge, Si, O, N, W, Mo, Ti, V, or B) can be suitably used.

It is preferable to use an alloy material containing an oxide, a metal nitride, or a metal carbide in the non-magnetic layer provided between the adjacent magnetic layers in the magnetic layer 16. Specifically, as the oxide, for example, $SiO_2$, $Al_2O_3$, $Ta_2O_5$, $Cr_2O_3$, MgO, $Y_2O_3$, $TiO_2$, or the like can be used. As the metal nitride, for example, AlN, $Si_3N_4$, TaN, CrN, or the like can be used. As the metal carbide, for example, TaC, BC, SiC, and the like can be used.

The non-magnetic layer can be formed by, for example, a sputtering method.

In order to realize a higher recording density, the magnetic layer 16 is preferably a magnetic layer of perpendicular magnetic recording in which the magnetization easy axis is oriented in a direction perpendicular to the substrate surface. The magnetic layer 16 may be a magnetic layer of in-plane magnetic recording.

The magnetic layer 16 may be formed by any known method in the related art, such as a vapor deposition method, an ion beam sputtering method, or a magnetron sputtering method. The magnetic layer 16 is usually formed by a sputtering method.

"Protective Layer"

The protective layer 17 protects the magnetic layer 16. The protective layer 17 may be composed of one layer or may be composed of a plurality of layers. As the protective layer 17, a carbon-based protective layer can be preferably used, and an amorphous carbon protective layer is particularly preferable. It is preferable that the protective layer 17 is a carbon-based protective layer since the interaction with the polar group (particularly, a hydroxy group) contained in the fluorine-containing ether compound in the lubricating layer 18 is further enhanced.

The adhesion force between the carbon-based protective layer and the lubricating layer 18 can be controlled by producing the carbon-based protective layer with hydrogenated carbon and/or nitrided carbon and adjusting the hydrogen content and/or the nitrogen content in the carbon-based protective layer. The hydrogen content in the carbon-based protective layer is preferably 3 atomic % to 20 atomic % in the case of being measured by hydrogen forward scattering (HFS). In addition, the nitrogen content in the carbon-based protective layer is preferably 4 atomic % to 15 atomic % in the case of being measured by X-ray photoelectron spectroscopy (XPS).

The hydrogen and/or nitrogen contained in the carbon-based protective layer does not need to be uniformly contained in the entire carbon-based protective layer. The carbon-based protective layer is suitably a composition gradient layer in which nitrogen is contained on the lubricating layer 18 side of the protective layer 17 and hydrogen is contained on the magnetic layer 16 side of the protective layer 17. In this case, the adhesion force between the magnetic layer 16 and the lubricating layer 18 and the carbon-based protective layer is further improved.

The film thickness of the protective layer 17 is preferably 1 nm to 7 nm. In a case where the film thickness of the protective layer 17 is 1 nm or more, the performance as the protective layer 17 can be sufficiently obtained. In a case where the film thickness of the protective layer 17 is 7 nm or less, it is preferable from the viewpoint of thinning the protective layer 17.

As a method for forming the protective layer 17, a sputtering method using a target material containing carbon, a chemical vapor deposition (CVD) method using a hydrocarbon raw material such as ethylene or toluene, an ion beam deposition (IBD) method, or the like can be used.

In a case where a carbon-based protective layer is formed as the protective layer 17, the film can be formed by, for example, a DC magnetron sputtering method. In particular, in a case where a carbon-based protective layer is formed as the protective layer 17, it is preferable to form an amorphous carbon protective layer by a plasma CVD method. The amorphous carbon protective layer formed by the plasma CVD method has a uniform surface and a small roughness.

"Lubricating Layer"

The lubricating layer 18 prevents the contamination of the magnetic recording medium 10. In addition, the lubricating layer 18 reduces the frictional force of the magnetic head of a magnetic recording and reproducing device that slides on the magnetic recording medium 10, and improves the durability of the magnetic recording medium 10.

As shown in FIG. 1, the lubricating layer 18 is formed in contact with the protective layer 17. The lubricating layer 18 is formed by applying the above-described lubricant for a magnetic recording medium of the embodiment onto the protective layer 17. Therefore, the lubricating layer 18 contains the above-described fluorine-containing ether compound.

In a case where the protective layer 17 disposed below the lubricating layer 18 is a carbon-based protective layer, particularly, the lubricating layer 18 is bonded to the protective layer 17 with a high bonding force. As a result, even in a case where the thickness of the lubricating layer 18 is small, it becomes easy to obtain the magnetic recording medium 10 in which the surface of the protective layer 17 is coated at a high coating rate, and the contamination of the surface of the magnetic recording medium 10 can be effectively prevented.

The average film thickness of the lubricating layer 18 is preferably 0.5 nm (5 Å) to 2.0 nm (20 Å) and more preferably 0.5 nm (5 Å) to 1.2 nm (12 Å). In a case where the average film thickness of the lubricating layer 18 is 0.5 nm or more, the lubricating layer 18 is formed with a uniform film thickness without being formed in an island shape or a mesh shape. Therefore, the surface of the protective layer 17 can be coated with the lubricating layer 18 at a high coating rate. In addition, when the average film thickness of the lubricating layer 18 is set to 2.0 nm or less, the lubricating layer 18 can be sufficiently thinned, and the floating height of the magnetic head can be sufficiently reduced.

"Method of Forming Lubricating Layer"

Examples of a method for forming the lubricating layer 18 include a method of preparing a magnetic recording medium in the middle of manufacturing in which each layer up to the protective layer 17 has been formed on the substrate 11, applying a solution for forming the lubricating layer onto the protective layer 17, and drying the solution.

The solution for forming the lubricating layer is obtained by dispersing and dissolving the lubricant for a magnetic recording medium of the above-described embodiment in a solvent as necessary and adjusting the viscosity and the concentration to be suitable for the application method.

Examples of the solvent used in the lubricating layer forming solution include fluorine-based solvents such as Vertrel (registered trademark) XF (product name, manufactured by Mitsui DuPont Fluorochemicals Co., Ltd.) and/or ASAHIKLIN (registered trademark) AE-3000 (product name, manufactured by AGC Inc.).

The method for applying the solution for forming the lubricating layer is not particularly limited, and examples thereof include a spin coating method, a spray coating method, a paper coating method, and a dipping method.

In a case where the dipping method is used, for example, the following method can be used. First, the substrate 11 on which each layer up to the protective layer 17 has been formed is immersed in the solution for forming the lubricating layer, which has been put into an immersion tank of a dip coating device. Next, the substrate 11 is pulled up from the immersion tank at a predetermined speed. As a result, the solution for forming the lubricating layer is applied onto the surface of the protective layer 17 on the substrate 11.

The use of the dipping method makes it possible to uniformly apply the solution for forming the lubricating layer to the surface of the protective layer 17, and makes it possible to form the lubricating layer 18 on the protective layer 17 with a uniform film thickness.

In the present embodiment, it is preferable to perform a heat treatment on the substrate 11 on which the lubricating layer 18 has been formed. The heat treatment improves the adhesion between the lubricating layer 18 and the protective layer 17 and improves the adhesion force between the lubricating layer 18 and the protective layer 17.

The heat treatment temperature is preferably set to 100° C. to 180° C. and more preferably set to 100° C. to 160° C. In a case where the heat treatment temperature is 100° C. or higher, an effect of improving the adhesion between the lubricating layer 18 and the protective layer 17 can be sufficiently obtained. In addition, when the heat treatment temperature is set to 180° C. or lower, the thermal decomposition of the lubricating layer 18 by the heat treatment can be prevented. The heat treatment time can be adjusted as appropriate depending on the heat treatment temperature, and is preferably 10 minutes to 120 minutes.

In the present embodiment, in order to further improve the adhesion force of the lubricating layer 18 with respect to the protective layer 17, a treatment of irradiating the lubricating layer 18 before or after the heat treatment with ultraviolet rays (UV) may also be performed.

The magnetic recording medium 10 of the present embodiment has at least the magnetic layer 16, the protective layer 17, and the lubricating layer 18 sequentially provided on the substrate 11. In the magnetic recording medium 10 of the present embodiment, the lubricating layer 18 containing the above-described fluorine-containing ether compound is formed in contact with the protective layer 17. This lubricating layer 18 has good chemical substance resistance and has a high spin-off suppression effect. Therefore, the magnetic recording medium 10 of the present embodiment has excellent reliability and durability. For this reason, the magnetic recording medium 10 of the present embodiment can reduce the magnetic head floating height (for example, 10 nm or less), and stably operates for a long period of time even in a severe environment due to the diversification of applications. Therefore, the magnetic recording medium 10 of the present embodiment is suitable as a magnetic disk mounted in, particularly, a load unload (LUL)-type magnetic disk apparatus.

EXAMPLES

Hereinafter, the present invention will be described in more detail with reference to Examples and Comparative Examples. The present invention is not limited to Examples described below.

Example 1

A compound (AA-1) represented by Formula (AA) was obtained by the following method.

(First Reaction)

20 g of a compound represented by $HOCH_2CF_2O(CF_2CF_2O)_h(CF_2O)_iCF_2CH_2OH$ (h representing the average degree of polymerization in the formula was 4.5, and i representing the average degree of polymerization was 4.5) (number-average molecular weight: 1000, molecular weight distribution: 1.1), 4.05 g of the compound represented by Formula (6-1), and 20 mL of t-butanol were charged into a 100 mL eggplant flask under a nitrogen gas atmosphere, and stirred at room temperature until uniform to produce a mixture. 1.12 g of potassium tert-butoxide was added to this mixture and stirred at 70° C. for 16 hours to perform a reaction.

The compound represented by Formula (6-1) was synthesized by protecting a hydroxy group of ethylene glycol monoallyl ether with dihydropyran and then oxidizing the protected hydroxy group with m-chloroperbenzoic acid.

The reaction product obtained after the reaction was cooled to 25° C., transferred to a separatory funnel containing 100 mL of water, and extracted three times with 100 mL of ethyl acetate. The organic layer was washed with water and dewatered with anhydrous sodium sulfate. After filtering off a desiccant, the filtrate was thickened, and the residue was purified by silica gel column chromatography to obtain 9.6 g of a compound represented by Formula (11) as an intermediate compound 1-1.

[Chemical Formula 24]

(11)

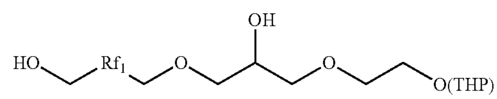

($Rf_1$ in Formula (11) is the PFPE chain represented by Formula (5-1). In $Rf_1$, h representing the average degree of polymerization represents 4.5, and i representing the average degree of polymerization represents 4.5. THP represents a tetrahydropyranyl group.)

(Second Reaction)

Subsequently, 9.0 g of a compound represented by Formula (11), which is the intermediate compound 1-1 obtained above, 0.64 g of 1,2,3,4-diepoxybutane represented by Formula (8-1), and 20 mL of t-butanol were charged into a 100 mL eggplant flask under a nitrogen gas atmosphere, and stirred at room temperature until uniform to produce a mixture. 0.40 g of potassium tert-butoxide was added to this mixture and stirred at 70° C. for 16 hours to perform a reaction.

The reaction product obtained after the reaction was cooled to 25° C., transferred to a separatory funnel containing 100 mL of water, and extracted three times with 100 mL of ethyl acetate. The organic layer was washed with water and dewatered with anhydrous sodium sulfate. After filtering off a desiccant, the filtrate was thickened, and the residue was purified by silica gel column chromatography to obtain 7.1 g of a compound represented by Formula (12) as an intermediate compound 1-2.

[Chemical Formula 25]

(12)

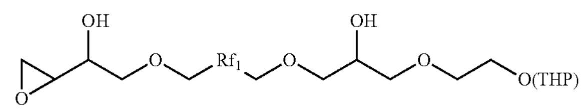

($Rf_1$ in Formula (12) is the PFPE chain represented by Formula (5-1). In $Rf_1$, h representing the average degree of polymerization represents 4.5, and i representing the average degree of polymerization represents 4.5. THP represents a tetrahydropyranyl group.)

(Third Reaction)

Subsequently, a compound represented by Formula (12), which is the intermediate compound 1-2 obtained above, was protected with dihydropyran to obtain a compound represented by Formula (13). Thereafter, 7.0 g of the compound represented by Formula (13) was added to a 100 mL eggplant flask under a nitrogen gas atmosphere, 0.23 g of 1,3,5-cyclohexanetriol and 20 mL of t-butanol were charged thereinto, and the components were stirred at room temperature until uniform to produce a mixture. 0.40 g of potassium tert-butoxide was added to this mixture and stirred at 70° C. for 48 hours to perform a reaction.

[Chemical Formula 26]

(13)

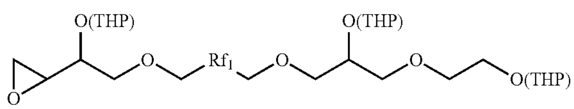

($Rf_1$ in Formula (13) is the PFPE chain represented by Formula (5-1). In $Rf_1$, h representing the average degree of polymerization represents 4.5, and i representing the average degree of polymerization represents 4.5. THP represents a tetrahydropyranyl group.)

A reaction solution obtained after the reaction was returned to room temperature, 50 g of a 10% hydrogen chloride/methanol solution (hydrogen chloride-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel containing 100 mL of saturated aqueous sodium bicarbonate and extracted twice with 200 mL of ethyl acetate. The organic layer was washed with 100 mL of saline, 100 mL of saturated aqueous sodium bicarbonate, and 100 mL of saline in this order, and dewatered with anhydrous sodium sulfate. After filtering off a desiccant, the filtrate was thickened, and the residue was purified by silica gel column chromatography to obtain 3.2 g of a compound (AA-1) ($Rf_1$ in Formula (AA) is the PFPE chain represented by Formula (5-1) described above. In three $Rf_1$'s, h representing the average degree of polymerization represents 4.5, and i representing the average degree of polymerization represents 4.5).

The obtained compound (AA-1) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 2

A compound (AA-2) represented by Formula (AA) was obtained by the following method.

The same operation as in Example 1 was performed except that a compound represented by $HOCH_2CF_2O(CF_2CF_2O)_h(CF_2O)_iCF_2CH_2OH$ (h representing the average degree of polymerization in the formula was 3.5, and i representing the average degree of polymerization was 3.5) (number-average molecular weight: 815, molecular weight distribution: 1.1) was used instead of the compound represented by $HOCH_2CF_2O(CF_2CF_2O)_h(CF_2O)_iCF_2CH_2OH$ (h representing the average degree of polymerization in the formula was 4.5, and i representing the average degree of polymerization was 4.5), and 4.5 g of a compound (AA-2) ($Rf_1$ in Formula (AA) is the PFPE chain represented by Formula (5-1). In three $Rf_1$'s, h representing the average degree of polymerization represents 3.5, and i representing the average degree of polymerization represents 3.5) was obtained.

The obtained compound (AA-2) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (21F), −78.5 (6F), −80.5 (6F), −91.0 to −88.5 (42F)

Example 3

A compound (AA-3) represented by Formula (AA) was obtained by the following method.

The same operation as in Example 1 was performed except that a compound represented by $HOCH_2CF_2O(CF_2CF_2O)_h(CF_2O)_iCF_2CH_2OH$ (h representing the average degree of polymerization in the formula was 5.5, and i representing the average degree of polymerization was 5.5) (number-average molecular weight: 1180, molecular weight distribution: 1.1) was used instead of the compound represented by $HOCH_2CF_2O(CF_2CF_2O)_h(CF_2O)_iCF_2CH_2OH$ (h representing the average degree of polymerization in the formula was 4.5, and i representing the average degree of polymerization was 4.5), and 3.5 g of a compound (AA-3) ($Rf_1$ in Formula (AA) is the PFPE chain represented by Formula (5-1). In three $Rf_1$'s, h representing the average degree of polymerization represents 5.5, and i representing the average degree of polymerization represents 5.5) was obtained.

The obtained compound (AA-3) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (33F), −78.5 (6F), −80.5 (6F), −91.0 to −88.5 (66F)

Example 4

A compound represented by Formula (AB) was obtained by the following method.

The same operation as in Example 1 was performed except that the compound represented by Formula (6-2) was used instead of the compound represented by Formula (6-1), and 4.4 g of a compound (AB) ($Rf_1$ in Formula (AB) is the PFPE chain represented by Formula (5-1). In three $Rf_1$'s, h representing the average degree of polymerization represents 4.5, and i representing the average degree of polymerization represents 4.5) was obtained.

The compound represented by Formula (6-2) was synthesized by protecting one hydroxy group of 1,3-propanediol with dihydropyran and then reacting epibromohydrin.

The obtained compound (AB) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (6H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 5

A compound represented by Formula (AC) was obtained by the following method.

The same operation as in Example 1 was performed except that the compound represented by Formula (6-3) was used instead of the compound represented by Formula (6-1), and 4.2 g of a compound (AC) ($Rf_1$ in Formula (AC) is the PFPE chain represented by Formula (5-1). In three $Rf_1$'s, h representing the average degree of polymerization represents 4.5, and i representing the average degree of polymerization represents 4.5) was obtained.

The compound represented by Formula (6-3) was synthesized by protecting a hydroxy group of glycidol with dihydropyran.

The obtained compound (AC) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (36H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 6

A compound represented by Formula (AD) was obtained by the following method.

The same operation as in Example 1 was performed except that the compound represented by Formula (6-4) was used instead of the compound represented by Formula (6-1), and 4.3 g of a compound (AD) ($Rf_1$ in Formula (AD) is the PFPE chain represented by Formula (5-1). In three $Rf_1$'s, h representing the average degree of polymerization represents 4.5, and i representing the average degree of polymerization represents 4.5) was obtained.

The compound represented by Formula (6-4) was synthesized by protecting a hydroxy group of 3-butene-1-ol with dihydropyran and then oxidizing the hydroxy group with m-chloro peracetic acid.

The obtained compound (AD) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (6H), 1.95 to 2.10 (12H), 2.50 (3H), 3.35 to 3.85 (36H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 7

A compound (AE) represented by Formula (AE) was obtained by the following method.

The same operation as in Example 1 was performed except that the compound represented by Formula (6-5) was used instead of the compound represented by Formula (6-1), and 4.3 g of a compound (AE) ($Rf_1$ in Formula (AE) is the PFPE chain represented by Formula (5-1). In three $Rf_1$'s, h representing the average degree of polymerization represents 4.5, and i representing the average degree of polymerization represents 4.5) was obtained.

The compound represented by Formula (6-5) was synthesized by causing 2-(2-bromoethoxy)tetrahydro-2H-pyran to act on a hydroxy group of 3-butene-1-ol, and then oxidizing the hydroxy group with m-chloroperbenzoic acid.

The obtained compound (AE) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (6H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 8

A compound represented by Formula (AF) was obtained by the following method.

The same operation as in Example 1 was performed except that a compound represented by Formula (6-6) was used instead of the compound represented by Formula (6-1), and 3.7 g of a compound (AF) ($Rf_1$ in Formula (AF) is the PFPE chain represented by Formula (5-1). In three $Rf_1$'s, h representing the average degree of polymerization represents 4.5, and i representing the average degree of polymerization represents 4.5) was obtained.

The compound represented by Formula (6-6) was synthesized by subjecting the compound represented by Formula (6-1) to an addition reaction with allyl alcohol, protecting the hydroxy group of the obtained compound with dihydropyran, and further oxidizing the hydroxy group with m-chloroperbenzoic acid.

The obtained compound (AF) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (15H), 2.50 (3H), 3.35 to 3.85 (63H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 9

A compound represented by Formula (AG) was obtained by the following method.

The same operation as in Example 1 was performed except that the compound represented by Formula (6-7) was used instead of the compound represented by Formula (6-1), and 3.8 g of a compound (AG) ($Rf_1$ in Formula (AG) is the PFPE chain represented by Formula (5-1). In three $Rf_1$'s, h representing the average degree of polymerization represents 4.5, and i representing the average degree of polymerization represents 4.5.) was obtained.

The compound represented by Formula (6-7) was synthesized by subjecting the compound represented by Formula (6-4) to an addition reaction with allyl alcohol, protecting the hydroxy group of the obtained compound with dihydropyran, and further oxidizing the hydroxy group with m-chloroperbenzoic acid.

The obtained compound (AG) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (6H), 1.95 to 2.10 (15H), 2.50 (3H), 3.35 to 3.85 (51H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 10

A compound represented by Formula (AH) was obtained by the following method.

The same operation as in Example 1 was performed except that the compound represented by Formula (6-8) was used instead of the compound represented by Formula (6-1), and 3.7 g of a compound (AH) ($Rf_1$ in Formula (AH) is the PFPE chain represented by Formula (5-1). In three $Rf_1$'s, h representing the average degree of polymerization represents 4.5, and i representing the average degree of polymerization represents 4.5) was obtained.

The compound represented by Formula (6-8) was synthesized by subjecting the compound represented by Formula (6-1) to an addition reaction with 3-butene-1-ol, protecting the hydroxy group of the obtained compound with dihydropyran, and further oxidizing the hydroxy group with m-chloroperbenzoic acid.

The obtained compound (AH) was subjected to $^1H$-NMR measurement and $^{19}F$-NMR measurement, and the structure was identified from the following results.

$^1H$-NMR (acetone-$D_6$): δ [ppm]=1.19 (3H), 1.65 to 1.85 (6H), 1.95 to 2.10 (15H), 2.50 (3H), 3.35 to 3.85 (63H), 3.85 to 4.10 (12H)

$^{19}F$-NMR (acetone-$D_6$): δ [ppm]=−55.5 to −51.5 (27F), −78.5 (6F), −80.5 (6F), −91.0 to −88.5 (54F)

Example 11

A compound represented by Formula (AI) was obtained by the following method.

An addition reaction was performed by the same operation as in Example 1 except that the amount of the compound represented by Formula (13) used in the third reaction of Example 1 was reduced to ⅔ and reacted with 1,3,5-cyclohexanetriol.

The reaction product obtained after the reaction was cooled to 25° C., transferred to a separatory funnel containing 100 ml of water, and extracted three times with 100 mL of ethyl acetate. The organic layer was washed with water and dewatered with anhydrous sodium sulfate. After filtering off a desiccant, the filtrate was thickened, and the residue was purified by silica gel column chromatography to obtain 4.6 g of a compound represented by Formula (14) as an intermediate compound.

[Chemical Formual 27]

(14)

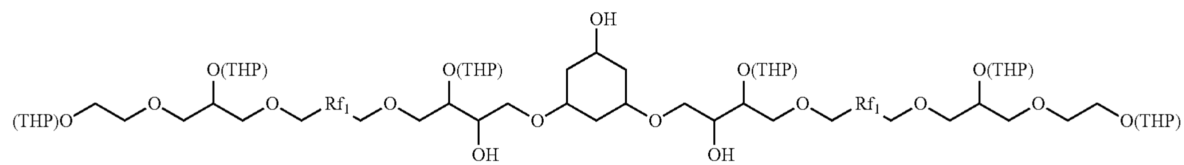

(In two $Rf_1$'s in Formula (14), h representing the average degree of polymerization represents 4.5, and i representing the average degree of polymerization represents 4.5. THP represents a tetrahydropyranyl group.)

Thereafter, 4.0 g of the compound represented by Formula (14) was added to a 100 mL eggplant flask under a nitrogen gas atmosphere, 2.0 g of the compound represented by Formula (15) as the intermediate compound of Example 8 and 20 mL of t-butanol were charged thereinto, and the components were stirred at room temperature until uniform to produce a mixture. 0.4 g of potassium tert-butoxide was added to this mixture and stirred at 70° C. for 24 hours to perform a reaction.

[Chemical Formula 28]

(15)

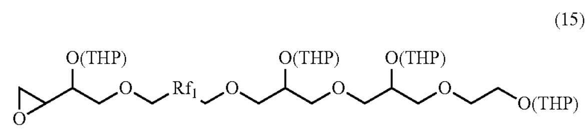

(In $Rf_1$ in Formula (15), h representing the average degree of polymerization represents 4.5, and i representing the average degree of polymerization represents 4.5. THP represents a tetrahydropyranyl group.)

A reaction solution obtained after the reaction was returned to room temperature, 50 g of a 10% hydrogen chloride/methanol solution (hydrogen chloride-methanol reagent (5% to 10%) manufactured by Tokyo Chemical Industry Co., Ltd.) was added thereto, and the mixture was stirred at room temperature for 4 hours. Thereafter, the reaction solution was gradually transferred to a separatory funnel containing 100 mL of saturated aqueous sodium bicarbonate and extracted twice with 200 mL of ethyl acetate. The organic layer was washed with 100 mL of saline, 100 mL of saturated aqueous sodium bicarbonate, and 100 mL of saline in this order, and dewatered with anhydrous sodium sulfate. After filtering off a desiccant, the filtrate was thickened, and the residue was purified by silica gel column chromatography to obtain 2.5 g of a compound (AI) ($Rf_1$ in Formula (AI) is the PFPE chain represented by Formula (5-1) described above. In three $Rf_1$'s, h representing the average degree of polymerization represents 4.5, and i representing the average degree of polymerization represents 4.5.).

The obtained compound (AI) was subjected to $^1H$-NMR measurement and $^{19}F$-NMR measurement, and the structure was identified from the following results.

$^1H$-NMR (acetone-$D_6$): δ [ppm]=1.19 (3H), 1.95 to 2.10 (13H), 2.50 (3H), 3.35 to 3.85 (53H), 3.85 to 4.10 (12H)

$^{19}F$-NMR (acetone-$D_6$): δ [ppm]=−55.5 to −51.5 (27F), −78.5 (6F), −80.5 (6F), −91.0 to −88.5 (54F)

Example 12

A compound represented by Formula (AJ) was obtained by the following method.

The same operation as in Example 1 was performed except that the compound represented by Formula (6-9) was used instead of the compound represented by Formula (6-1), and 4.6 g of a compound (AJ) ($Rf_1$ in Formula (AJ) is the PFPE chain represented by Formula (5-1). In three $Rf_1$'s, h representing the average degree of polymerization represents 4.5, and i representing the average degree of polymerization represents 4.5.) was obtained.

The compound represented by Formula (6-9) was synthesized by protecting one hydroxy group of 1,6-hexanediol with dihydropyran and then reacting epibromohydrin.

The obtained compound (AJ) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (24H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 13

A compound represented by Formula (AK) was obtained by the following method.

The same operation as in Example 1 was performed except that the compound represented by Formula (6-10) was used instead of the compound represented by Formula (6-1), and 4.2 g of a compound (AK) ($Rf_1$ in Formula (AK) is the PFPE chain represented by Formula (5-1). In three $Rf_1$'s, h representing the average degree of polymerization represents 4.5, and i representing the average degree of polymerization represents 4.5) was obtained.

The compound represented by Formula (6-10) was synthesized by protecting a hydroxy group of 7-octene-1-ol with dihydropyran and then oxidizing the hydroxy group with m-chloro peracetic acid.

The obtained compound (AK) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (30H), 1.95 to 2.10 (12H), 2.50 (3H), 3.35 to 3.85 (36H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 14

A compound represented by Formula (AL) was obtained by the following method.

The same operation as in Example 1 was performed except that the compound represented by Formula (6-11) was used instead of the compound represented by Formula (6-1), and 4.3 g of a compound (AL) ($Rf_1$ in Formula (AL) is the PFPE chain represented by Formula (5-1). In three $Rf_1$'s, h representing the average degree of polymerization represents 4.5, and i representing the average degree of polymerization represents 4.5) was obtained.

The compound represented by Formula (6-11) was synthesized by causing 2-(2-bromoethoxy)tetrahydro-2H-pyran to act on a hydroxy group of 5-hexene-1-ol, and then oxidizing the hydroxy group with m-chloroperbenzoic acid.

The obtained compound (AL) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (18H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 15

A compound represented by Formula (AM) was obtained by the following method.

The same operation as in Example 1 was performed except that 1,2,7,8-diepoxyoctane represented by Formula (8-2) was used instead of the compound represented by Formula (8-1), and 4.8 g of a compound (AM) ($Rf_1$ in Formula (AM) is the PFPE chain represented by Formula (5-1). In three $Rf_1$'s, h representing the average degree of polymerization represents 4.5, and i representing the average degree of polymerization represents 4.5.) was obtained.

The obtained compound (AM) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (24H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 16

A compound represented by Formula (AN) was obtained by the following method.

The same operation as in Example 1 was performed except that a compound represented by Formula (8-3) was used instead of the compound represented by Formula (8-1), and 4.8 g of a compound (AN) ($Rf_1$ in Formula (AN) is the PFPE chain represented by Formula (5-1). In three $Rf_1$'s, h representing the average degree of polymerization represents 4.5, and i representing the average degree of polymerization represents 4.5.) was obtained.

The compound represented by Formula (8-3) was synthesized by oxidizing 1,9-decadiene with m-chloroperbenzoic acid.

The obtained compound (AN) was subjected to $^1$H-NMR measurement and $^{19}$F-NMR measurement, and the structure was identified from the following results.

$^1$H-NMR (acetone-$D_6$): δ [ppm]=1.19 (3H), 1.65 to 1.85 (36H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 17

A compound represented by Formula (AO) was obtained by the following method.

The same operation as in Example 1 was performed except that the compound represented by Formula (8-4) was used instead of the compound represented by Formula (8-1), and 5.0 g of a compound (AO) ($Rf_1$ in Formula (AO) is the PFPE chain represented by Formula (5-1). In three $Rf_1$'s, h representing the average degree of polymerization represents 4.5, and i representing the average degree of polymerization represents 4.5.) was obtained.

The compound represented by Formula (8-4) was synthesized by oxidizing allyl glycidyl ether with m-chloroperbenzoic acid.

The obtained compound (AO) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (60H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 18

A compound represented by Formula (AP) was obtained by the following method.

The same operation as in Example 1 was performed except that the compound represented by Formula (6-6) was used instead of the compound represented by Formula (6-1) and the compound represented by Formula (8-4) was used instead of the compound represented by Formula (8-1), and 3.8 g of a compound (AP) ($Rf_1$ in Formula (AP) is the above-described PFPE chain represented by Formula (5-1). In three $Rf_1$'s, h representing the average degree of polymerization represents 4.5, and i representing the average degree of polymerization represents 4.5.) was obtained.

The obtained compound (AP) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (15H), 2.50 (3H), 3.35 to 3.85 (75H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 19

A compound represented by Formula (AQ) was obtained by the following method.

The same operation as in Example 1 was performed except that the compound represented by Formula (8-5) was used instead of the compound represented by Formula (8-1), and 3.5 g of a compound (AQ) ($Rf_1$ in Formula (AQ) is the PFPE chain represented by Formula (5-1). In three $Rf_1$'s, h representing the average degree of polymerization represents 4.5, and i representing the average degree of polymerization represents 4.5.) was obtained.

The compound represented by Formula (8-5) was synthesized by reacting 2 molecules of allyl alcohol with 1 molecule of epibromohydrin, then, protecting the secondary hydroxy group of the compound generated after the reaction using dihydropyran, and further oxidizing the hydroxy group with m-chloroperbenzoic acid.

The obtained compound (AQ) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (15H), 2.50 (3H), 3.35 to 3.85 (75H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 20

A compound (AA-4) represented by Formula (AA) was obtained by the following method.

The same operation as in Example 1 was performed except that a compound represented by $HOCH_2CF_2O(CF_2CF_2O)_h(CF_2O)_iCF_2CH_2OH$ (h representing the average degree of polymerization in the formula was 7.0, and i representing the average degree of polymerization was 0) (number-average molecular weight: 990, molecular weight distribution: 1.1) was used instead of the compound represented by $HOCH_2CF_2O(CF_2CF_2O)_h(CF_2O)_iCF_2CH_2OH$ (h representing the average degree of polymerization in the formula was 4.5, and i representing the average degree of polymerization was 4.5), and 4.6 g of a compound (AA-4) ($Rf_1$ in Formula (AA) is the PFPE chain represented by Formula (5-1). In three $Rf_1$'s, h representing the average degree of polymerization represents 7.0, and i representing the average degree of polymerization represents 0.) was obtained.

The obtained compound (AA-4) was subjected to $^1$H-NMR measurement and $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−78.5 (6F), −81.0 (6F), −91.0 to −88.5 (84F)

Example 21

A compound represented by Formula (AR) was obtained by the following method.

The same operation as in Example 1 was performed except that a compound represented by $HOCH_2CF_2CF_2O(CF_2CF_2CF_2O)_jCF_2CF_2CH_2OH$ (j representing the average degree of polymerization in the formula was 4.5) (number-average molecular weight: 1020, molecular weight distribution: 1.1) was used instead of the compound represented by $HOCH_2CF_2O(CF_2CF_2O)_h(CF_2O)_iCF_2CH_2OH$, and 4.7 g of a compound 5 (AR) ($Rf_2$ in Formula (AR) is the PFPE chain represented by Formula (5-2). In three $Rf_2$'s, j representing the average degree of polymerization represents 4.5.) was obtained.

The obtained compound (AR) was subjected to a $^1$H-NMR measurement and a $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−84.0 to −83.0 (54F), −86.4 (12F), −124.3 (12F), −130.0 to −129.0 (27F)

Example 22

A compound represented by Formula (AS) was obtained by the following method.

The same operation as in Example 1 was performed except that a compound represented by $HOCH_2CF_2CF_2CF_2O(CF_2CF_2CF_2CF_2O)_xCF_2CF_2CF_2CH_2OH$ (k representing the average degree of polymerization in the formula was 3.0) (number-average molecular weight: 995, molecular weight distribution: 1.1) was used instead of the compound represented by $HOCH_2CF_2O(CF_2CF_2O)_h(CF_2O)_iCF_2CH_2OH$, and 4.1 g of a compound (AS) ($Rf_3$ in the formula (AS) is the PFPE chain represented by the formula (5-3). In three $Rf_3$'s, k representing the average degree of polymerization represents 3.0.) was obtained.

The obtained compound (AS) was subjected to a $^1$H-NMR measurement and a $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−84.0 to −83.0 (48F), −122.5 (12F), −126.0 (36F), −129.0 to −128.0 (12F)

Example 23

A compound represented by Formula (AT) was obtained by the following method.

(First Reaction)

A primary hydroxy group of the compound represented by Formula (11) described in Example 1 was protected with tert-butyldimethylchlorosilane to obtain a compound represented by Formula (16).

[Chemical Formula 29]

(16)

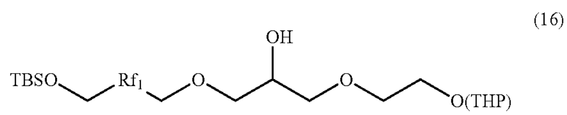

($Rf_1$ in Formula (16) is the PFPE chain represented by Formula (5-1). In $Rf_1$, h representing the average degree of polymerization represents 4.5, and i representing the average degree of polymerization represents 4.5. THP represents a tetrahydropyranyl group, and TBS represents a tert-butyldimethylsilyl group.)

Subsequently, 7.0 g of the compound represented by Formula (16), which is the intermediate compound obtained above, 0.96 g of 2-(2-bromoethoxy)tetrahydro-2H-pyran represented by Formula (10-1), and 20 mL of t-butanol were charged into a 100 mL eggplant flask under a nitrogen gas atmosphere, and stirred at room temperature until uniform to produce a mixture. 0.50 g of potassium tert-butoxide was added to this mixture and stirred at 70° C. for 8 hours to perform a reaction.

The reaction product obtained after the reaction was cooled to 25° C., transferred to a separatory funnel containing 100 mL of water, and extracted three times with 100 mL of ethyl acetate. The organic layer was washed with water and dewatered with anhydrous sodium sulfate. After filtering off a desiccant, the filtrate was thickened, and the residue was purified by silica gel column chromatography to obtain 5.5 g of a compound represented by Formula (17) as an intermediate compound.

[Chemical Formula 30]

(17)

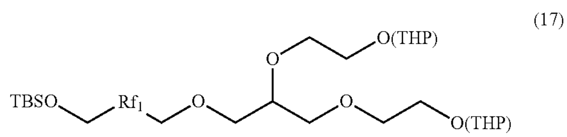

($Rf_1$ in Formula (17) is the PFPE chain represented by Formula (5-1). In $Rf_1$, h representing the average degree of polymerization represents 4.5, and i representing the average degree of polymerization represents 4.5. THP represents a tetrahydropyranyl group, and TBS represents a tert-butyldimethylsilyl group.)

The tert-butyldimethylsilyl group was deprotected using tetrabutylammonium fluoride in the compound represented by Formula (17), which was the intermediate compound obtained above, to obtain a compound represented by Formula (18).

[Chemical Formula 31]

(18)

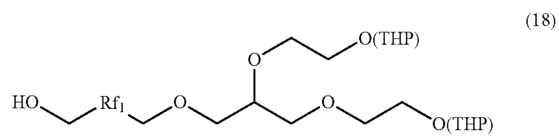

($Rf_1$ in Formula (18) is the PFPE chain represented by Formula (5-1). In $Rf_1$, h representing the average degree of polymerization represents 4.5, and i representing the average degree of polymerization represents 4.5. THP represents a tetrahydropyranyl group.)

(Second Reaction and Third Reaction)

The same operation as the second reaction and the third reaction in Example 1 was performed except that the compound represented by Formula (18) was used instead of the compound represented by Formula (11), and 4.0 g of a compound (AT) ($Rf_1$ in Formula (AT) is the PFPE chain represented by Formula (5-1). In three $Rf_1$'s, h representing the average degree of polymerization represents 4.5, and i representing the average degree of polymerization represents 4.5.) was obtained.

The obtained compound (AT) was subjected to a $^1$H-NMR measurement and a $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (60H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 24

A compound represented by Formula (AU) was obtained by the following method.

A compound represented by Formula (19), which is an intermediate compound of the first reaction, was obtained by the method described in Example 5.

[Chemical Formula 32]

(19)

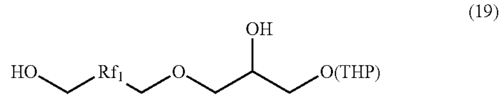

($Rf_1$ in Formula (19) is the PFPE chain represented by Formula (5-1). In $Rf_1$, h representing the average degree of polymerization represents 4.5, and i representing the average degree of polymerization represents 4.5. THP represents a tetrahydropyranyl group.)

The same operation as in Example 23 was performed except that the compound represented by Formula (19) was used instead of the compound represented by Formula (11), and 4.3 g of a compound (AU) ($Rf_1$ in Formula (AU) is the PFPE chain represented by Formula (5-1). In three $Rf_1$'s, h representing the average degree of polymerization represents 4.5, and i representing the average degree of polymerization represents 4.5) was obtained.

The obtained compound (AU) was subjected to a $^1$H-NMR measurement and a $^{19}$F-NMR measurement, and the structure was identified from the following results.

$^1$H-NMR (acetone-$D_6$): δ [ppm]=1.19 (3H), 1.95 to 2.10 (12H), 2.50 (3H), 3.35 to 3.85 (48H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 25

A compound represented by Formula (BA) was obtained by the following method.

The same operation as in Example 1 was performed except that 1,3,5-benzenetriol was used instead of 1,3,5-cyclohexanetriol, and 2.9 g of a compound (BA) ($Rf_1$ in Formula (BA) is the PFPE chain represented by Formula (5-1). In three $Rf_1$'s, h representing the average degree of polymerization represents 4.5, and i representing the average degree of polymerization represents 4.5.) was obtained.

The obtained compound (BA) was subjected to a $^{1}$H-NMR measurement and a $^{19}$F-NMR measurement, and the structure was identified from the following results.

$^{1}$H-NMR (acetone-$D_6$): δ [ppm]=1.95 to 2.10 (12H), 3.35 to 3.85 (45H), 3.85 to 4.10 (12H), 6.60 to 6.80 (3H)

$^{19}$F-NMR (acetone-$D_6$): δ [ppm]=−55.5 to −51.5 (27F), −78.5 (6F), −80.5 (6F), −91.0 to −88.5 (54F)

Example 26

A compound represented by Formula (BB) was obtained by the following method.

The same operation as in Example 1 was performed except that 1,3,5-cyclohexanetrimethanol was used instead of 1,3,5-cyclohexanetriol, and 5.1 g of a compound (BB) ($Rf_1$ in Formula (BB) is the PFPE chain represented by Formula (5-1). In three $Rf_1$'s, h representing the average degree of polymerization represents 4.5, and i representing the average degree of polymerization represents 4.5.) was obtained.

The obtained compound (BB) was subjected to $^{1}$H-NMR and $^{19}$F-NMR measurements, and the structure was identified from the following results.

$^{1}$H-NMR (acetone-$D_6$): δ [ppm]=1.19 (3H), 1.95 to 2.10 (12H), 2.50 (3H), 3.35 to 3.85 (54H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 27

A compound represented by Formula (BC) was obtained by the following method.

The same operation as in Example 1 was performed except that glycerin was used instead of 1,3,5-cyclohexanetriol, and 4.4 g of a compound (BC) ($Rf_1$ in Formula (BC) is the PFPE chain represented by Formula (5-1). In three $Rf_1$'s, h representing the average degree of polymerization represents 4.5, and i representing the average degree of polymerization represents 4.5) was obtained.

The obtained compound (BC) was subjected to a $^{1}$H-NMR measurement and a $^{19}$F-NMR measurement, and the structure was identified from the following results.

$^{1}$H-NMR (acetone-$D_6$): δ [ppm]=1.95 to 2.10 (12H), 3.35 to 3.85 (50H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Example 28

A compound represented by Formula (BD) was obtained by the following method.

The same operation as in Example 1 was performed except that trimethylolpropane was used instead of 1,3,5-cyclohexanetriol, and 4.3 g of a compound (BD) ($Rf_1$ in Formula (BD) is the PFPE chain represented by Formula (5-1). In three $Rf_1$'s, h representing the average degree of polymerization represents 4.5, and i representing the average degree of polymerization represents 4.5) was obtained.

The obtained compound (BD) was subjected to a $^{1}$H-NMR measurement and a $^{19}$F-NMR measurement, and the structure was identified from the following results.

$^{1}$H-NMR (acetone-$D_6$): δ [ppm]=1.10 (3H), 1.65 to 1.85 (2H), 1.95 to 2.10 (12H), 3.35 to 3.85 (51H), 3.85 to 4.10 (12H)

$^{19}$F-NMR (acetone-$D_6$): δ [ppm]=−55.5 to −51.5 (27F), −78.5 (6F), −80.5 (6F), −91.0 to −88.5 (54F)

Structures of X, A, B, and D in a case where the compounds (AA) to (AU) and (BA) to (BD) of Examples 1 to 28 obtained as described above were each applied to General Formula (1) are shown in Table 1. In all of the structures, the structures of three A's, three B's, and three D's in General Formula (1) are the same as one another except for the compound (AI). Three D's of the compound (AI) are each denoted as D1, D2, or D3 in Table 1.

TABLE 1

| Compound | X | A | B | D |
|---|---|---|---|---|
| (AA-1) | (2-1) | (3-1) n = 0 | (5-1): h = 4.5, i = 4.5 | (4-1) p = 0/q = 0/r = 1 |
| (AA-2) | (2-1) | (3-1) n = 0 | (5-1): h = 3.5, i = 3.5 | (4-1) p = 0/q = 0/r = 1 |
| (AA-3) | (2-1) | (3-1) n = 0 | (5-1): h = 5.5, i = 5.5 | (4-1) p = 0/q = 0/r = 1 |
| (AB) | (2-1) | (3-1) n = 0 | (5-1): h = 4.5, i = 4.5 | (4-1) p = 0/q = 0/r = 2 |
| (AC) | (2-1) | (3-1) n = 0 | (5-1): h = 4.5, i = 4.5 | (4-2) s = 0/t = 0 |
| (AD) | (2-1) | (3-1) n = 0 | (5-1): h = 4.5, i = 4.5 | (4-2) s = 0/t = 1 |
| (AE) | (2-1) | (3-1) n = 0 | (5-1): h = 4.5, i = 4.5 | (4-1) p = 1/q = 0/r = 1 |
| (AF) | (2-1) | (3-1) n = 0 | (5-1): h = 4.5, i = 4.5 | (4-1) p = 0/q = 1/r = 1 |
| (AG) | (2-1) | (3-1) n = 0 | (5-1): h = 4.5, i = 4.5 | (4-2) s = 1/t = 1 |
| (AH) | (2-1) | (3-1) n = 0 | (5-1): h = 4.5, i = 4.5 | (4-1) p = 1/q = 1/r = 1 |
| (AI) | (2-1) | (3-1) n = 0 | (5-1): h = 4.5, i = 4.5 | D1: (4-1) p = 0/q = 0/r = 1<br>D2: (4-1) p = 0/q = 0/r = 1<br>D3: (4-1) p = 0/q = 1/r = 1 |
| (AJ) | (2-1) | (3-1) n = 0 | (5-1): h = 4.5, i = 4.5 | (4-1) p = 0/q = 0/r = 5 |
| (AK) | (2-1) | (3-1) n = 0 | (5-1): h = 4.5, i = 4.5 | (4-2) s = 0/t = 5 |
| (AL) | (2-1) | (3-1) n = 0 | (5-1): h = 4.5, i = 4.5 | (4-1) p = 3/q = 0/r = 1 |
| (AM) | (2-1) | (3-1) n = 4 | (5-1): h = 4.5, i = 4.5 | (4-1) p = 0/q = 0/r = 1 |
| (AN) | (2-1) | (3-1) n = 6 | (5-1): h = 4.5, i = 4.5 | (4-1) p = 0/q = 0/r = 1 |
| (AO) | (2-1) | (3-2) m = 1 | (5-1): h = 4.5, i = 4.5 | (4-1) p = 0/q = 0/r = 1 |
| (AP) | (2-1) | (3-2) m = 1 | (5-1): h = 4.5, i = 4.5 | (4-1) p = 0/q = 1/r = 1 |
| (AQ) | (2-1) | (3-2) m = 2 | (5-1): h = 4.5, i = 4.5 | (4-1) p = 0/q = 0/r = 1 |
| (AA-4) | (2-1) | (3-1) n = 0 | (5-1): h = 7.0, i = 0 | (4-1) p = 0/q = 0/r = 1 |
| (AR) | (2-1) | (3-1) n = 0 | (5-2): j = 4.5 | (4-1) p = 0/q = 0/r = 1 |
| (AS) | (2-1) | (3-1) n = 0 | (5-3): k = 3.0 | (4-1) p = 0/q = 0/r = 1 |
| (AT) | (2-1) | (3-1) n = 0 | (5-1): h = 4.5, i = 4.5 | (4-3) u = 2/Y = $-CH_2OCH_2-$ |
| (AU) | (2-1) | (3-1) n = 0 | (5-1): h = 4.5, i = 4.5 | (4-3) u = 2/Y = single bond |
| (BA) | (2-2) | (3-1) n = 0 | (5-1): h = 4.5, i = 4.5 | (4-1) p = 0/q = 0/r = 1 |
| (BB) | (2-3) | (3-1) n = 0 | (5-1): h = 4.5, i = 4.5 | (4-1) p = 0/q = 0/r = 1 |
| (BC) | (2-4) a = 0 | (3-1) n = 0 | (5-1): h = 4.5, i = 4.5 | (4-1) p = 0/q = 0/r = 1 |
| (BD) | (2-5) b = 2 | (3-1) n = 0 | (5-1): h = 4.5, i = 4.5 | (4-1) p = 0/q = 0/r = 1 |

Comparative Example 1

A compound represented by Formula (ZA) was synthesized by the method described in Patent Document 1.

[Chemical Formula 33]

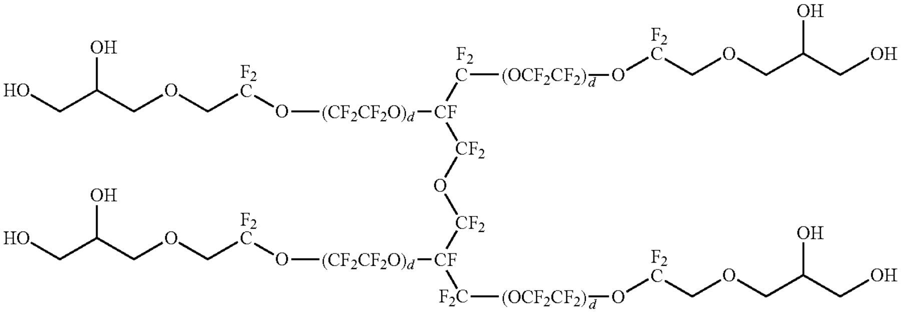

(ZA)

(In Formula (ZA), d representing the average degree of polymerization represents 7.0.)

Comparative Example 2

A compound represented by Formula (ZB) was synthesized by the method described in Patent Document 2.

[Chemical Formula 34]

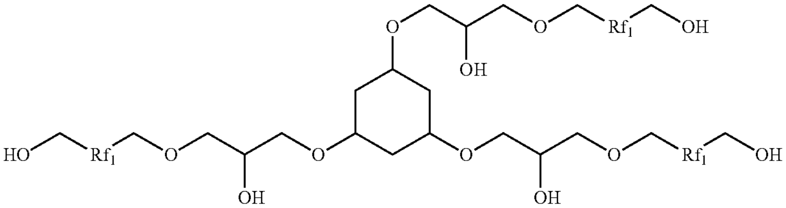

(ZB)

($Rf_1$ in Formula (ZB) is the PFPE chain represented by Formula (5-1). In three $Rf_1$'s, h representing the average degree of polymerization represents 4.5, and i representing the average degree of polymerization represents 4.5.)

Comparative Example 3

A compound represented by Formula (ZC) was synthesized by the method described in Patent Document 2.

[Chemical Formula 35]

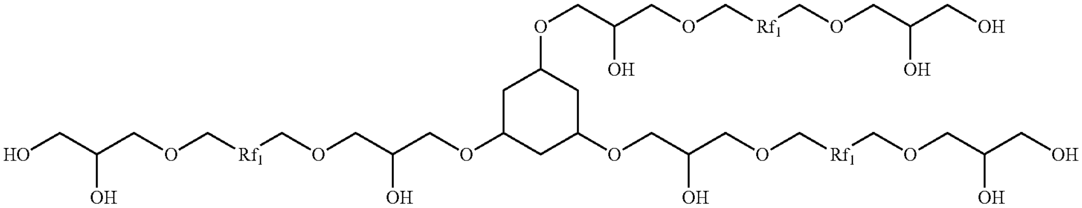

(ZC)

($Rf_1$ in Formula (ZC) is the PFPE chain represented by Formula (5-1). In three $Rf_1$'s, h representing the average degree of polymerization represents 4.5, and i representing the average degree of polymerization represents 4.5.)

Comparative Example 4

A compound represented by Formula (ZD) was synthesized by the method described in Patent Document 3.

[Chemical Formula 36]

(ZD)

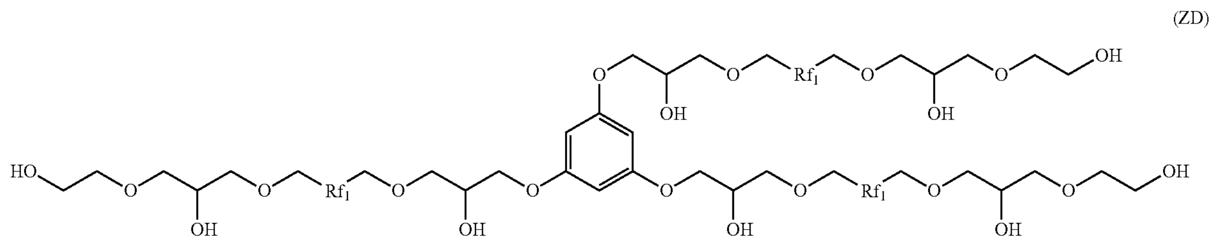

($Rf_1$ in Formula (ZD) is the PFPE chain represented by Formula (5-1). In three $Rf_1$'s, h representing the average degree of polymerization represents 4.5, and i representing the average degree of polymerization represents 4.5.)

Comparative Example 5

A compound represented by Formula (ZE) was synthesized by the method described in Patent Document 4.

[Chemical Formula 37]

(ZE)

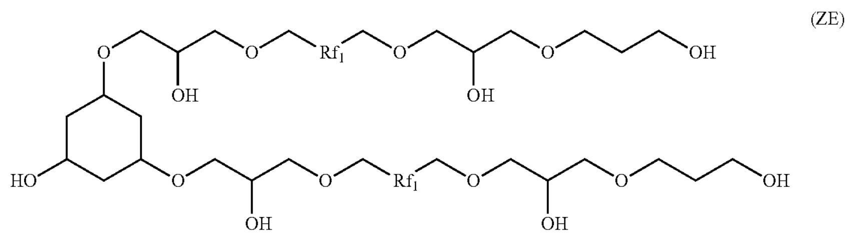

($Rf_1$ in Formula (ZE) is the PFPE chain represented by Formula (5-1). In two $Rf_1$'s, h representing the average degree of polymerization represents 4.5, and i representing the average degree of polymerization represents 4.5.)

Comparative Example 6

A compound represented by Formula (ZF) was synthesized by the method described in Patent Document 5.

[Chemical Formula 38]

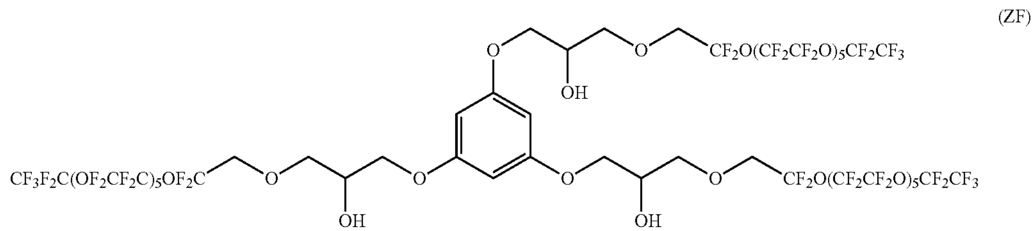

(ZF)

Comparative Example 7

A compound represented by Formula (ZG) was synthesized by the method described in Patent Document 6.

[Chemical Formula 39]

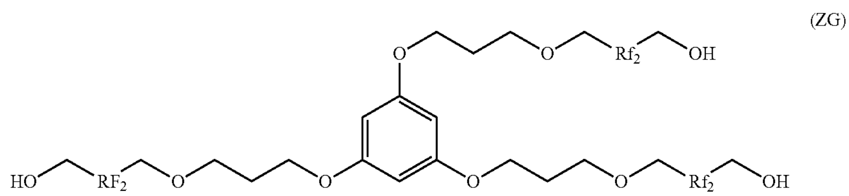

(ZG)

($Rf_2$ in Formula (ZG) is the PFPE chain represented by Formula (5-2). In three $Rf_2$'s, j representing the average degree of polymerization represents 4.5.)

Comparative Example 8

A compound represented by Formula (ZH) was synthesized by the method described in Patent Document 7.

[Chemical Formula 40]

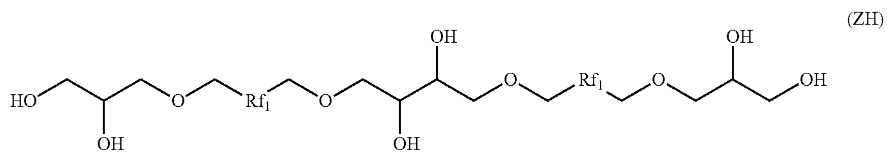

(ZH)

($Rf_1$ in Formula (ZH) is the PFPE chain represented by Formula (5-1). In two $Rf_1$'s, h representing the average degree of polymerization represents 4.5, and i representing the average degree of polymerization represents 4.5.)

Comparative Example 9

A compound represented by Formula (ZI) was synthesized by the method described in Patent Document 8.

[Chemical Formual 41]

(ZI)

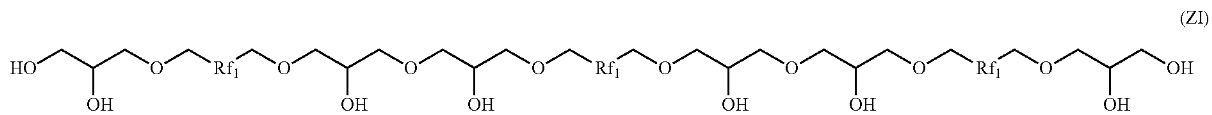

($Rf_1$ in Formula (ZI) is the PFPE chain represented by Formula (5-1). In three $Rf_1$'s, h representing the average degree of polymerization represents 7.0, and i representing the average degree of polymerization represents 0.)

Comparative Example 10

A compound represented by Formula (ZJ) was synthesized by the method described in Patent Document 9.

[Chemical Formual 42]

(ZJ)

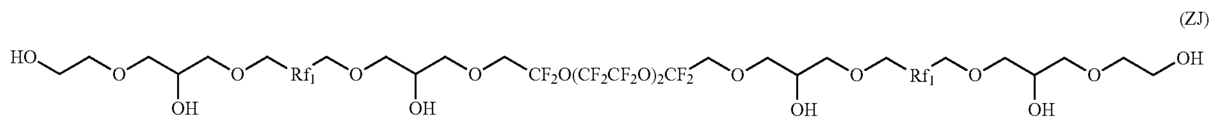

($Rf_1$ in Formula (7J) is the PFPE chain represented by Formula (5-1). In two $Rf_1$'s, h representing the average degree of polymerization represents 4.5, and i representing the average degree of polymerization represents 4.5.)

The number-average molecular weights (Mn) of the compounds of Examples 1 to 28 and Comparative Examples 1 to 10 obtained as described above were measured by the above-described method. The results thereof are shown in Table 2 and Table 3.

Next, lubricating layer forming solutions were prepared using the compounds obtained in Examples 1 to 28 and Comparative Examples 1 to 10 by a method described below. In addition, lubricating layers for a magnetic recording medium were formed using the obtained lubricating layer forming solutions by the following method, and magnetic recording media of Examples 1 to 28 and Comparative Examples 1 to 10 were obtained.

"Solution for Forming Lubricating Layer"

Each of the compounds obtained in Examples 1 to 28 and Comparative Examples 1 to 10 was dissolved in BARTLEL (registered trademark) XF (trade name, manufactured by Mitsui DuPont Fluorochemicals Co., Ltd.), which is a fluorine-based solvent, and diluted with Vertrel XF so that the film thickness In the case of being applied onto the protective layer was 9.0 Å to 9.5 Å, thereby obtaining a lubricating layer forming solution.

"Magnetic Recording Medium"

A magnetic recording medium in which an adhesion layer, a soft magnetic layer, a first underlayer, a second underlayer, a magnetic layer, and a protective layer were sequentially provided on a substrate having a diameter of 65 mm was prepared. The protective layer was composed of carbon.

The lubricating layer forming solutions of Examples 1 to 28 and Comparative Examples 1 to 10 were applied onto the protective layer of the magnetic recording medium on which each layer up to the protective layer had been formed by a dipping method. The dipping method was performed under conditions of an immersion rate of 10 mm/sec, an immersion time of 30 sec, and a lifting rate of 1.2 mm/sec.

Thereafter, the magnetic recording medium coated with the lubricating layer forming solution was placed in a thermostatic chamber, and a heat treatment for removing the solvent in the lubricating layer forming solution and improving the adhesion between the protective layer and the lubricating layer was performed at 140° C. for 10 minutes to form a lubricating layer on the protective layer, thereby obtaining a magnetic recording medium.

(Film Thickness Measurement)

The film thicknesses of the lubricating layers of the magnetic recording media of Examples 1 to 28 and Comparative Examples 1 to 10 thus obtained were measured using a Fourier transform infrared spectrophotometer (FT-IR, product name: Nicolet iS50, manufactured by Thermo Fisher Scientific). The results thereof are shown in Table 2 and Table 3.

Next, the chemical substance resistance test and the spin-off resistance test shown below were performed on the magnetic recording media of Examples 1 to 28 and Comparative Examples 1 to 10.

[Chemical Substance Resistance Test]

The following chemical substance resistance test was performed, and the chemical substance resistance was evaluated based on the following evaluation standards. The results thereof are shown in Table 2 and Table 3.

Figure 2:
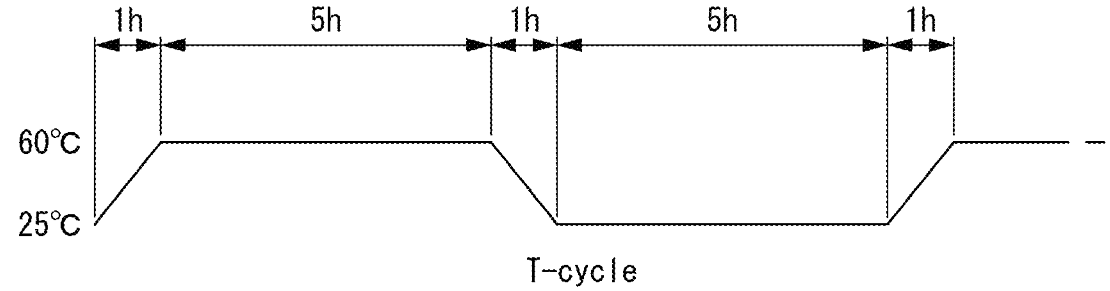
FIG. 2 is a view for describing an environment in which a continuous LUL operation is repeated.

A load/unload (LUL)-type hard disk drive was prepared and mounted on the magnetic recording medium on which the lubricating layer had been formed. A head for perpendicular magnetic recording was used as the head of the hard disk drive. A commercially available silicone rubber gel chip (1 cm×1 cm×0.5 cm) was put into this hard disk drive, and the continuous LUL operation was repeated until the drive current of a spindle motor exceeded the threshold value in the environment shown below. In the environment of the continuous LUL operation, as shown in FIG. 2, a 5-hour cycle operation of 25° C.→60° C.→25° C. (1 hour for each of rising and falling) was performed in a dry environment (relative humidity of 10% or less). In addition, a time from the start of the continuous LUL operation to a time when the drive current of the spindle motor exceeded the threshold value was defined as the durability time. In a case where the durability time was more than 150 hours, the SEM observation of the vertical magnetic recording head used in the test was performed, and the contamination area of the head was evaluated from the SEM image.

In a case where the compound in the lubricating layer is uniformly disposed on the protective layer without a gap, the adhesion of cyclic siloxane vaporized from the silicone rubber gel chip to the magnetic recording medium is prevented. Therefore, no loads are applied to the spindle motor of the hard disk drive, and the durability time is increased. On the other hand, in a case where the compound in the lubricating layer aggregates, a gap is formed in the lubricating layer, and the vaporized cyclic siloxane adheres to the magnetic recording medium. As a result, a load is applied to the spindle motor of the hard disk drive, and the durability time is shortened.

"Evaluation Standard for Chemical Substance Resistance Test"

A+: The durability time is 150 hours or longer, and the head contamination area is 50 $\mu m^2$ or less.

A: The durability time is 150 hours or longer, and the head contamination area is more than 50 $\mu m^2$ and 100 $\mu m^2$ or less.

B: The durability time was 150 hours or longer, and the head contamination area was more than 100 $\mu m^2$.

C: The durability time was 100 hours or longer and shorter than 150 hours.

D: The durability time was shorter than 100 hours.

[Spin-Off Resistance Test]

The magnetic recording medium was mounted on a spin stand and rotated at a rotation speed of 10,000 rpm for 72 hours in an environment of a temperature of 80° C. and a relative humidity of 60%. Before and after this operation, the film thickness of the lubricating layer at a position within a radius of 20 mm from the center of the magnetic recording medium was measured by FT-IR, and the film thickness reduction rates of the lubricating layer after 24 hours, 48 hours, and 72 hours from the start of the test were calculated. For the magnetic recording medium in which the film thickness reduction rate exceeded 9% before 72 hours was reached, the evaluation was stopped in the middle. The spin resistance was evaluated according to the following evaluation standards using the evaluation time and the calculated film thickness reduction rate.

"Evaluation Standard for Spin-Off Resistance Test"

A+: The film thickness reduction rate after 72 hours was 2% or less.

A: The film thickness reduction rate after 72 hours was more than 2% and 3% or less.

B: film thickness reduction rate after 72 hours was more than 3% and 9% or less.

C: The film thickness reduction rate after 72 hours was more than 9%.

D: The film thickness reduction rate after 48 hours was more than 9%.

[Comprehensive Evaluations]

Based on the results of the chemical substance resistance test and the spin-off resistance test, comprehensive evaluations were performed based on the following standards.

"Comprehensive Evaluations"

A: Both the evaluation of the chemical substance resistance test and the evaluation of the spin-off resistance test are A+ or A.

B: One of the evaluation of the chemical substance resistance test and the evaluation of the spin-off resistance test is B, and the other is A+, A, or B.

C: One of the evaluation of the chemical substance resistance test and the evaluation of the spin-off resistance test is C, and the other is A+, A, B, or C.

D: At least one of the evaluation of the chemical substance resistance test and the evaluation of the spin-off resistance test is D

TABLE 2

| | Compound | Molecular weight | Film thickness (Å) | Chemical substance resistance | Spin-off resistance | Comprehensive evaluation |
|---|---|---|---|---|---|---|
| Example 1 | (AA-1) | 3958 | 9.3 | A | A | A |
| Example 2 | (AA-2) | 3403 | 9.2 | A+ | B | B |
| Example 3 | (AA-3) | 4498 | 9.3 | B | A+ | B |
| Example 4 | (AB) | 4600 | 9.5 | A | A | A |
| Example 5 | (AC) | 3826 | 9.3 | A | A | A |
| Example 6 | (AD) | 3868 | 9.3 | A | A | A |
| Example 7 | (AE) | 4000 | 9.3 | A | A | A |
| Example 8 | (AF) | 4180 | 9.3 | A | A+ | A |
| Example 9 | (AG) | 4090 | 9.4 | A | A+ | A |
| Example 10 | (AH) | 4222 | 9.2 | A | A+ | A |
| Example 11 | (AI) | 4032 | 9.2 | A | A | A |
| Example 12 | (AJ) | 4126 | 9.2 | B | A | B |
| Example 13 | (AK) | 4036 | 9.5 | B | A | B |
| Example 14 | (AL) | 4084 | 9.3 | A | A | A |
| Example 15 | (AM) | 4126 | 9.3 | A | A | A |
| Example 16 | (AN) | 4211 | 9.4 | A | A | A |
| Example 17 | (AO) | 4090 | 9.2 | A | A | A |
| Example 18 | (AP) | 4313 | 9.4 | A | A+ | A |
| Example 19 | (AQ) | 4313 | 9.5 | A | A | A |
| Example 20 | (AA-4) | 3928 | 9.4 | A | A | A |
| Example 21 | (AR) | 4018 | 9.4 | A | A | A |
| Example 22 | (AS) | 3943 | 9.3 | A | A | A |
| Example 23 | (AT) | 4090 | 9.3 | A | A | A |
| Example 24 | (AU) | 3958 | 9.4 | A | A | A |
| Example 25 | (BA) | 3952 | 9.4 | A | A | A |
| Example 26 | (BB) | 4000 | 9.4 | A | A | A |
| Example 27 | (BC) | 3918 | 9.3 | A | A | A |
| Example 28 | (BD) | 3960 | 9.4 | A | A | A |

TABLE 3

| | Compound | Molecular weight | Film thickness (Å) | Chemical substance resistance | Spin-off resistance | Comprehensive evaluation |
|---|---|---|---|---|---|---|
| Comparative Example 1 | (ZA) | 4284 | 9.3 | D | C | D |
| Comparative Example 2 | (ZB) | 3493 | 9.4 | B | D | D |
| Comparative Example 3 | (ZC) | 3715 | 9.4 | C | C | C |
| Comparative Example 4 | (ZD) | 3841 | 9.5 | C | B | C |
| Comparative Example 5 | (ZE) | 2637 | 9.4 | C | D | D |
| Comparative Example 6 | (ZF) | 2719 | 9.3 | D | D | D |
| Comparative Example 7 | (ZG) | 3493 | 9.4 | D | D | D |
| Comparative Example 8 | (ZH) | 2362 | 9.5 | C | D | D |
| Comparative Example 9 | (ZI) | 3601 | 9.5 | D | C | D |
| Comparative Example 10 | (ZJ) | 2887 | 9.3 | D | D | D |

As shown in Table 2, in Examples 1 to 28, the evaluation results of the chemical substance resistance test and the evaluation results of the spin-off resistance test were both good. On the other hand, as shown in Table 3, in Comparative Examples 1 to 10, the results were that either or both of the chemical substance resistance test and the spin-off resistance test were poor.

Example 2 is a compound in which the molecular weight of the perfluoropolyether chain B is lower than that of Example 1. Therefore, in Example 2, the coatability was improved, and the chemical substance resistance was more excellent. Incidentally, in Example 2, a tendency of deterioration in spin-off resistance was observed, but good results were obtained. Example 3 is a compound in which the molecular weight of the perfluoropolyether chain B is higher than that of Example 1.

Therefore, in Example 3, although a tendency of deterioration in chemical substance resistance was observed, good results were obtained, and the spin-off resistance was more excellent.

Examples 8 to 10 and 18 have a structure in which all of three terminal groups D have three hydroxy groups. It is considered that these compounds have a stronger interaction with the protective layer, and thus have excellent chemical substance resistance and exhibit more excellent spin-off resistance.

In Examples 12 and 13, the chemical substance resistance is good results, but a tendency of deterioration is observed as compared with Example 1. This is considered to be because Examples 12 and 13 have a structure in which a portion having a larger number of carbon atoms than the number of fluorine atoms is present in the lubricating layer containing the fluorine-containing ether compound. In Examples 12 and 14, the positions of the ether bonds introduced between two hydroxy groups in D are different. More specifically, in Example 14, the ether bond is introduced into a position closer to the primary hydroxy group as compared with Example 12. Therefore, in Example 14, it is considered that the movement of the primary hydroxy group is imparted with flexibility, and the interaction with the protective layer is further strengthened. Accordingly, it is considered that Example 14 exhibits more excellent chemical substance resistance than Example 12.

Comparative Example 1 is a compound in which no polar groups are present between the trivalent atomic group and the perfluoropolyether chain and the terminal group is the compound represented by Formula (4-2). In Comparative Example 1, the chemical substance resistance and the spin-off resistance were poor. This is considered to be because only the terminal group has an interaction with the protective layer by the polar group, and the adhesion is insufficient.

Comparative Example 2 is a compound in which the trivalent atomic group has the structure represented by Formula (2-1), but each of the hydroxy groups included in the linking group and the terminal group is one. Therefore, the chemical substance resistance was good, but the spin-off resistance was poor.

Comparative Example 3 is a compound having a structure in which the trivalent atomic group is represented by Formula (2-1), and the terminal group is represented by Formula (4-2), but having one hydroxy group in the linking group. Therefore, the chemical substance resistance deteriorated, and the spin-off resistance was improved as compared with Comparative Example 2, but both were poor.

Comparative Example 4 is a compound which has a structure in which the trivalent atomic group is represented by Formula (2-2), and the terminal group is represented by Formula (4-1), but has one hydroxy group in the linking group. Therefore, the spin-off resistance was good, but the chemical substance resistance was poor.

Comparative Example 5 is a compound which has an annular structure in the center and has a structure in which the terminal group is represented by Formula (4-1) and in which the number of the perfluoropolyether chains bonded to the central annular structure through the linking groups is 2, and the number of hydroxy groups contained in the linking group is 1. Therefore, the chemical substance resistance and the spin-off resistance were poor.

Comparative Example 6 is a compound in which the trivalent atomic group has a structure represented by Formula (2-2), but the number of the hydroxy groups included in the linking group is one and the terminal group does not have any polar groups. Therefore, the chemical substance resistance and the spin-off resistance were poor.

Comparative Example 7 is a compound in which the trivalent atomic group has the structure represented by Formula (2-2), but does not have a polar group in the linking group, and the terminal group is a hydroxy group. Therefore, the chemical substance resistance and the spin-off resistance were poor.

Comparative Example 8 is a compound in which two perfluoropolyether chains are linked through the linking group represented by Formula (3-1), and the terminal group is represented by Formula (4-2). Therefore, the chemical substance resistance and the spin-off resistance were poor.

Comparative Example 9 is a compound in which three perfluoropolyether chains are linked through the linking group represented by Formula (3-2), and the terminal group is represented by Formula (4-2). Therefore, the chemical substance resistance and the spin-off resistance were poor.

Comparative Example 10 is a compound in which three perfluoropolyether chains are linked through the linking group having one hydroxy group, and the terminal group is represented by Formula (4-1). Therefore, the chemical substance resistance and the spin-off resistance were poor.

From the above, it was found that, by forming lubricating layers containing the compounds of Examples 1 to 28 on the protective layers of the magnetic recording media, lubricating layers having good chemical substance resistance and a high spin-off suppression effect can be obtained even in a case where the thicknesses are as small as 9.0 Å to 9.5 Å.

INDUSTRIAL APPLICABILITY

The use of the lubricant for a magnetic recording medium containing the fluorine-containing ether compound of the present invention makes it possible to form a lubricating layer having good chemical substance resistance and a high spin-off suppression effect.

REFERENCE SIGNS LIST

- 10 Magnetic recording medium
- 11 Substrate
- 12 Adhesion layer
- 13 Soft magnetic layer
- 14 First underlayer
- 15 Second underlayer
- 16 Magnetic layer
- 17 Protective layer
- 18 Lubricating layer

The invention claimed is:

1. A fluorine-containing ether compound represented by the following general formula (1):

[Chemical Formula 1]

(1)

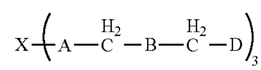

(in General Formula (1), X is a trivalent atomic group represented by any one of Formulae (2-1) to (2-5) below, A is a linking group represented by Formula (3-1) or Formula (3-2) below, three A's may be the same in part or in whole, or may be different from each other, B is a perfluoropolyether chain, three B's may be the same in part or in whole, or may be different from each other, D is a terminal group which has 2 to 4 polar groups, has an ether oxygen atom bonded to a methylene group adjacent to D, has 1 to 15 carbon atoms, and has 0 to 9 carbon atoms in a shortest distance between carbon atoms to which adjacent polar groups in D are bonded, and three D's may be the same as one another in part or in whole, or may be different from each other),

[Chemical Formula 2]

(2-1)

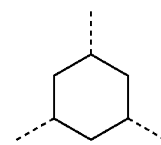

(2-2)

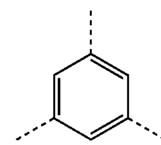

(2-3)

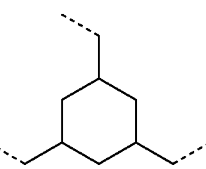

(2-4)

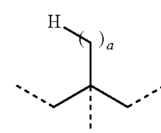

(2-5)

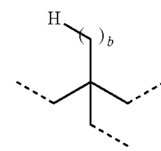

(in Formula (2-4), a represents an integer of 0 to 5),
(in Formula (2-5), b represents an integer of 0 to 5),

[Chemical Formula 3]

(3-1)

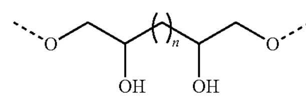

(3-2)

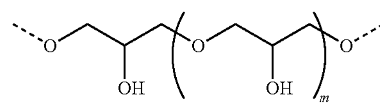

(in Formula (3-1), n represents an integer of 0 to 6),
(in Formula (3-2), m represents an integer of 1 to 2).

2. The fluorine-containing ether compound according to claim 1, wherein, in Formula (2-4), a is 0, and in Formula (2-5), b is an integer of 0 to 2.

3. The fluorine-containing ether compound according to claim 1, wherein the polar group is at least one polar group selected from the group consisting of a hydroxy group, an amino group, and a carboxy group.

4. The fluorine-containing ether compound according to claim 1, wherein the polar group contains at least one hydroxy group.

5. The fluorine-containing ether compound according to claim 1, wherein D's in General Formula (1) are each independently a terminal group represented by any of Formulae (4-1) to (4-3),

[Chemical Formula 4]

(4-1)

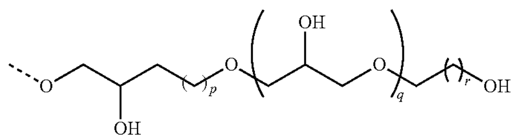

(4-2)

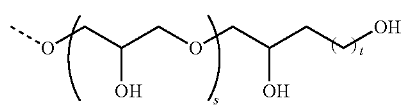

(4-3)

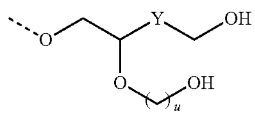

(in Formula (4-1), p represents an integer of 0 to 3, q represents an integer of 0 to 2, r represents an integer of 1 to 5, and a total value of p and r is 1 to 5), (in Formula (4-2), s represents an integer of 0 to 2, and t represents an integer of 0 to 5), (in Formula (4-3), u represents an integer of 2 to 4, Y represents a linear alkylene group which may have an ether oxygen atom, or a single bond, and in a case where Y is the alkylene group, a total number of carbon atoms and oxygen atoms contained in Y is 1 to 5).

6. The fluorine-containing ether compound according to claim 1, wherein all the three D's in General Formula (1) are the same as one another.

7. The fluorine-containing ether compound according to claim 1, wherein at least one of the three A's in General Formula (1) is Formula (3-1).

8. The fluorine-containing ether compound according to claim 1, wherein the three B's in General Formula (1) are each independently a perfluoropolyether chain represented by Formula (5),

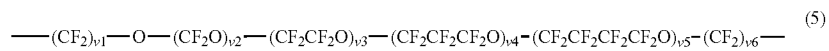

$$-(CF_2)_{v1}-O-(CF_2O)_{v2}-(CF_2CF_2O)_{v3}-(CF_2CF_2CF_2O)_{v4}-(CF_2CF_2CF_2CF_2O)_{v5}-(CF_2)_{v6}- \quad (5)$$

(in Formula (5), v2, v3, v4, and v5 represent average degrees of polymerization, and each independently represent 0 to 20, where, all of v2, v3, v4, and v5 are not 0 at the same time, v1 and v6 are average values representing the number of $CF_2$'s, and each independently represent 1 to 3, and repeating units of $(CF_2O)$, $(CF_2CF_2O)$, $(CF_2CF_2CF_2O)$, and $(CF_2CF_2CF_2CF_2O)$ may be arranged in any order in Formula (5).

9. The fluorine-containing ether compound according to claim 1, wherein the three B's in General Formula (1) are each independently any one selected from perfluoropolyether chains represented by Formulae (5-1) to (5-4),

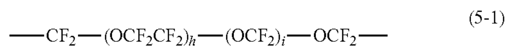

$$-CF_2-(OCF_2CF_2)_h-(OCF_2)_i-OCF_2- \quad (5-1)$$

(in Formula (5-1), h and i represent average degrees of polymerization, h represents 1 to 20, and i represents 0 to 20),

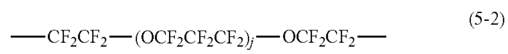

$$-CF_2CF_2-(OCF_2CF_2CF_2)_j-OCF_2CF_2- \quad (5-2)$$

(in Formula (5-2), j represents an average degree of polymerization, and represents 1 to 15,

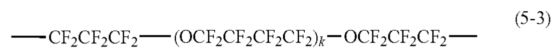

$$-CF_2CF_2CF_2-(OCF_2CF_2CF_2CF_2)_k-OCF_2CF_2CF_2- \quad (5-3)$$

(in Formula (5-3), k represents an average degree of polymerization, and represents 1 to 10),

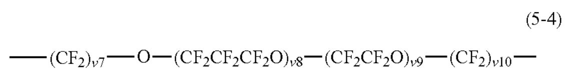

$$-(CF_2)_{v7}-O-(CF_2CF_2CF_2O)_{v8}-(CF_2CF_2O)_{v9}-(CF_2)_{v10}- \quad (5-4)$$

(in Formula (5-4), v8 and v9 represent average degrees of polymerization, and each independently represent 1 to 20, v7 and v10 are average values representing the number of $CF_2$'s, and each independently represent 1 to 2).

10. The fluorine-containing ether compound according to claim 1, wherein a number-average molecular weight is within a range of 500 to 10000.

11. A lubricant for a magnetic recording medium, comprising:

the fluorine-containing ether compound according to claim 1.

12. A magnetic recording medium comprising at least in order, on a substrate:

a magnetic layer;

a protective layer; and a lubricating layer, wherein the lubricating layer contains the fluorine-containing ether compound according to claim 1.

13. The magnetic recording medium according to claim 12, wherein an average film thickness of the lubricating layer is 0.5 nm to 2.0 nm.

* * * * *